(12) United States Patent  (10) Patent No.: US 9,117,047 B2
Nonomura  (45) Date of Patent: Aug. 25, 2015

(54) DIAGNOSIS DEVICE, CONTROL METHOD OF DIAGNOSIS DEVICE, AND RECORDING MEDIUM

(71) Applicant: FUJITSU LIMITED, Kawasaki-shi, Kanagawa (JP)

(72) Inventor: Yukinobu Nonomura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/490,851

(22) Filed: Sep. 19, 2014

(65) Prior Publication Data
US 2015/0149974 A1  May 28, 2015

(30) Foreign Application Priority Data
Nov. 28, 2013  (JP) ................................. 2013-246802

(51) Int. Cl.
*G06F 9/455* (2006.01)
*G06F 17/50* (2006.01)
*H03K 19/177* (2006.01)

(52) U.S. Cl.
CPC ........ *G06F 17/5054* (2013.01); *H03K 19/1776* (2013.01); *H03K 19/17764* (2013.01); *G06F 2217/64* (2013.01)

(58) Field of Classification Search
USPC .......................... 716/103, 104, 105, 106, 107
See application file for complete search history.

(56) References Cited

U.S. PATENT DOCUMENTS

| | | | |
|---|---|---|---|
| 6,748,574 B2* | 6/2004 | Sasagawa et al. | 716/123 |
| 6,968,514 B2* | 11/2005 | Cooke et al. | 716/102 |
| 7,107,190 B1* | 9/2006 | Tsuchiya et al. | 703/1 |
| 7,467,362 B2* | 12/2008 | Shigihara et al. | 716/136 |
| 8,712,752 B2* | 4/2014 | Lau et al. | 703/18 |
| 2002/0157074 A1* | 10/2002 | Sato | 716/10 |
| 2003/0208721 A1* | 11/2003 | Regnier | 716/1 |
| 2008/0127021 A1* | 5/2008 | Goel et al. | 716/10 |

FOREIGN PATENT DOCUMENTS

| | | |
|---|---|---|
| JP | 2008-52389 | 3/2008 |
| JP | 2009-44473 | 2/2009 |

* cited by examiner

*Primary Examiner* — Brian Ngo
(74) *Attorney, Agent, or Firm* — Fujitsu Patent Center

(57) ABSTRACT

A diagnosis device including a storage unit configured to store first circuit configuration information, a circuit unit configured to configure a first plurality of circuits based on the first circuit configuration information and a second plurality of circuits based on second circuit configuration information, and a processor configured to update the first circuit configuration information to the second circuit configuration information and configured to diagnose all circuits newly added by the second circuit configuration information of the second plurality of circuits.

12 Claims, 16 Drawing Sheets

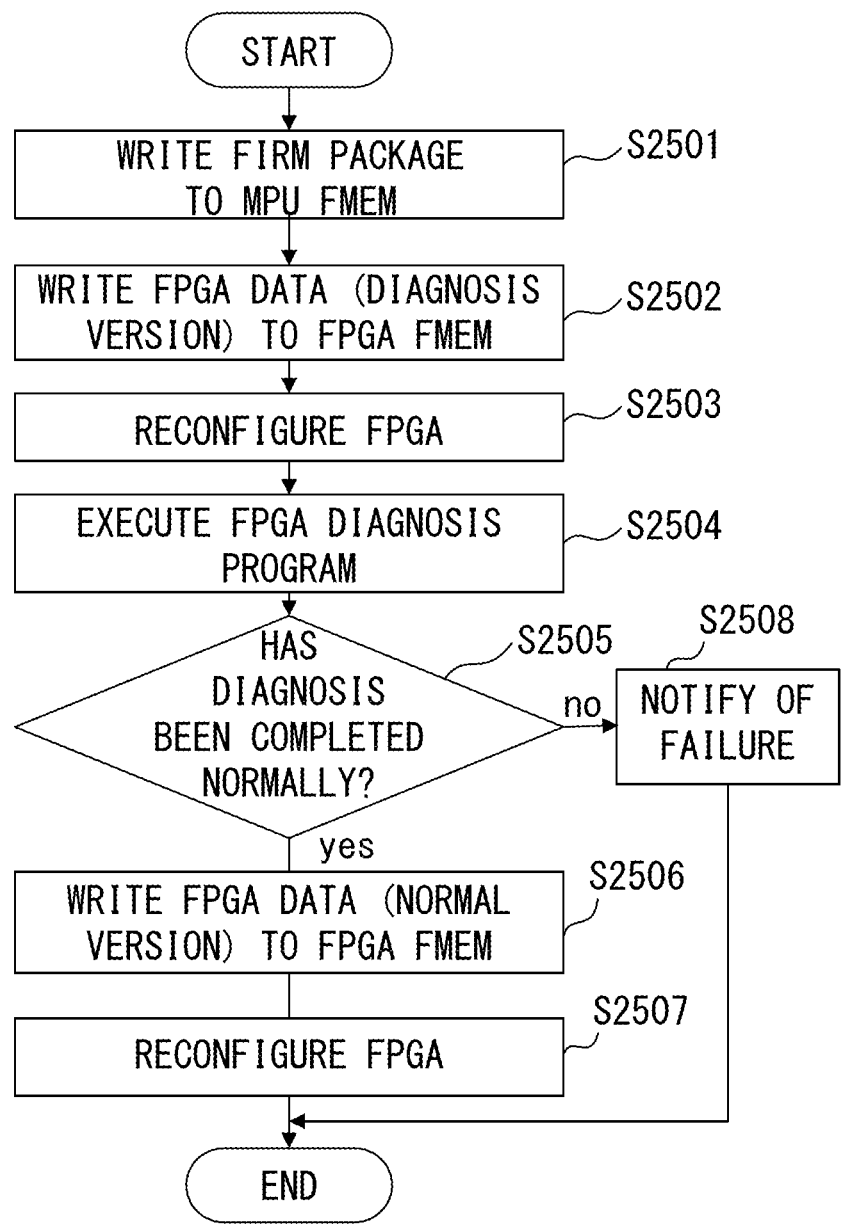
F I G. 10

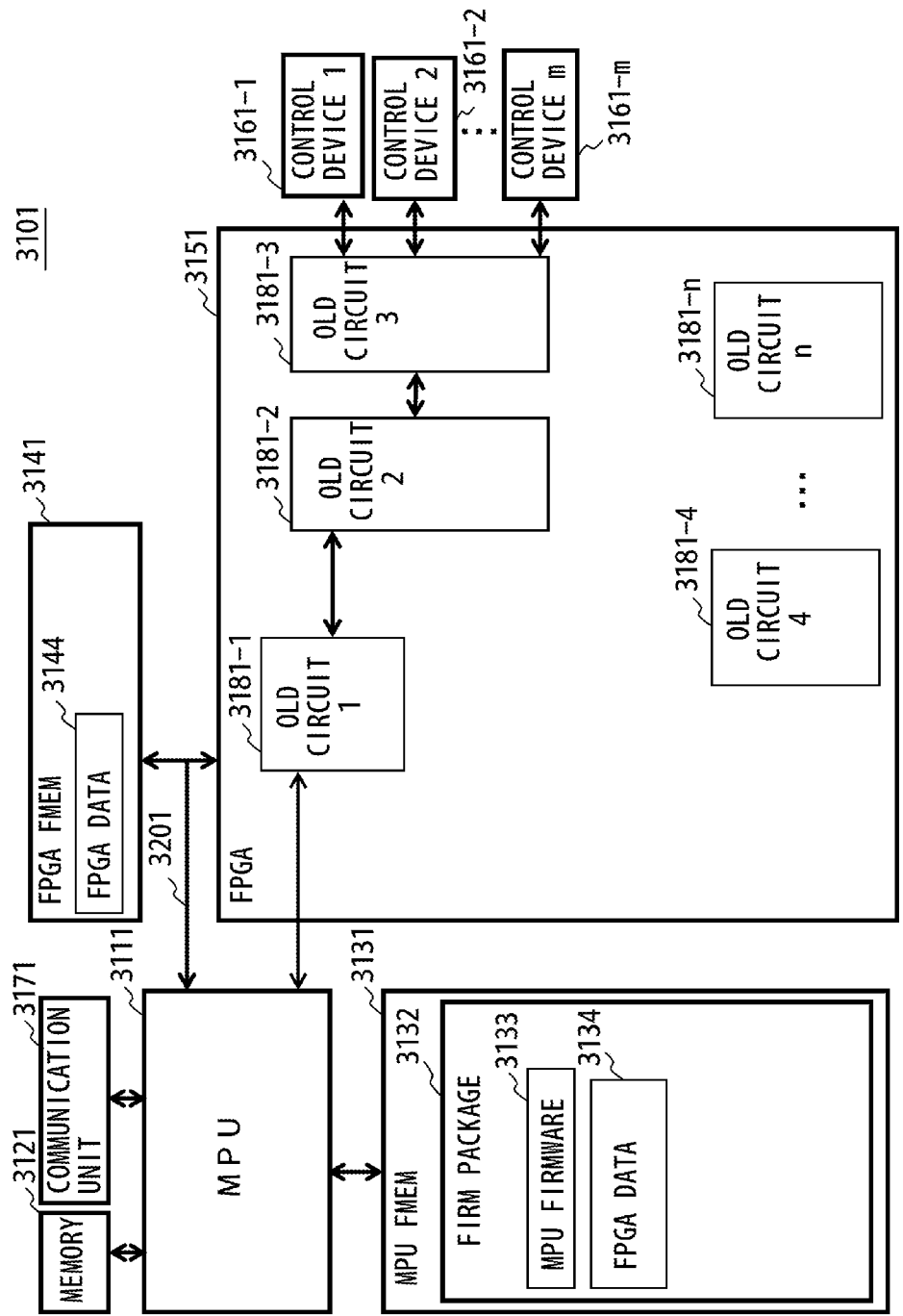
F I G. 12

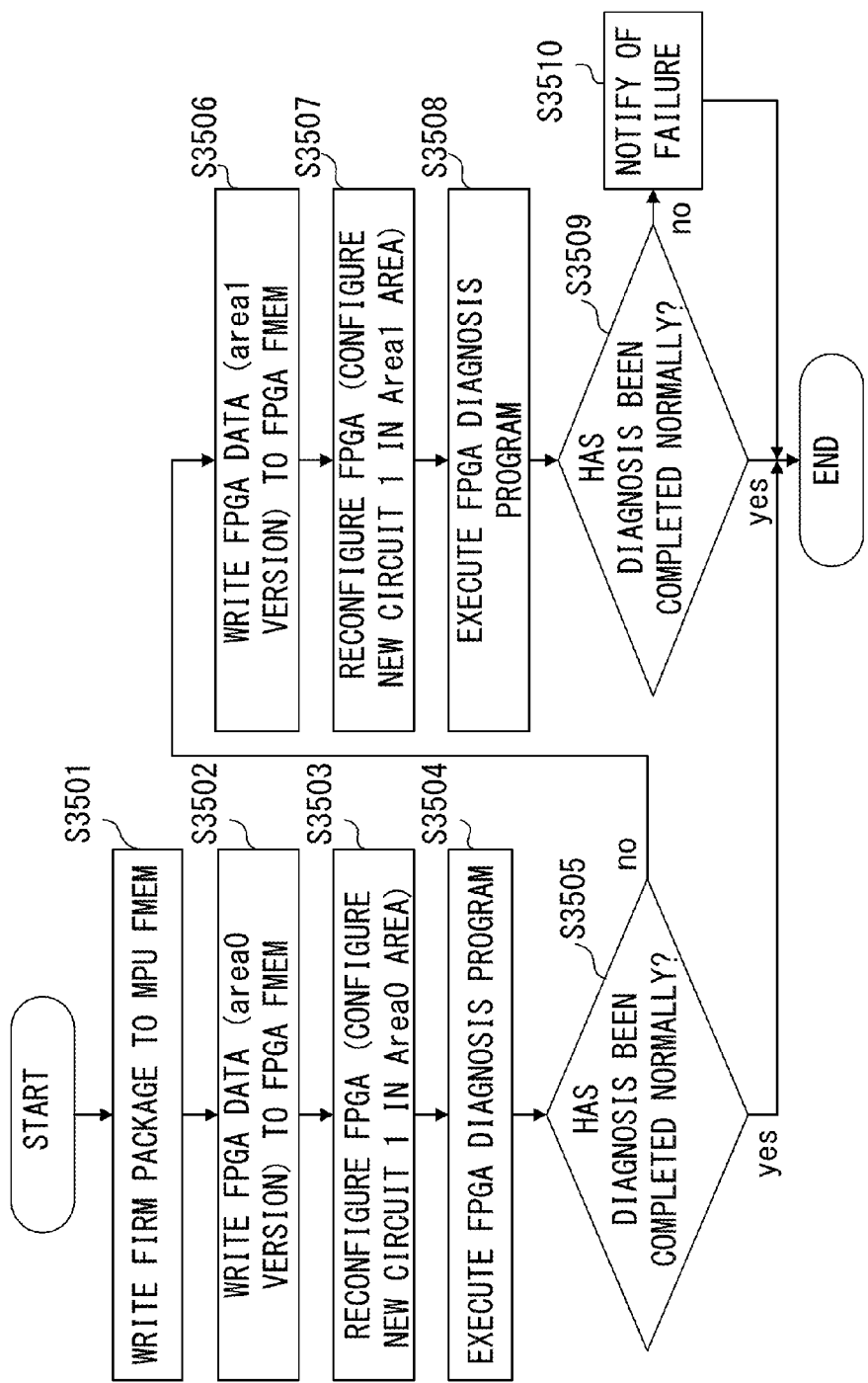
F I G. 15

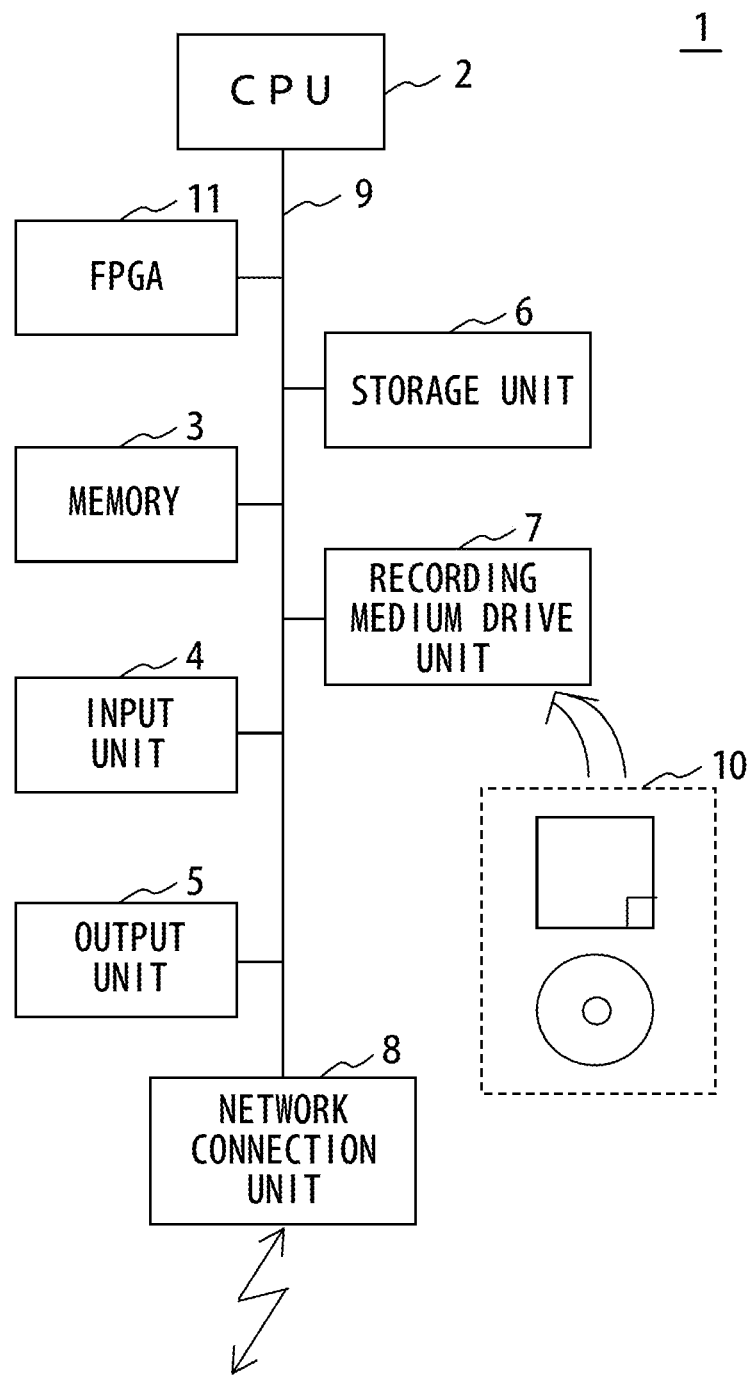
F I G. 16

DIAGNOSIS DEVICE, CONTROL METHOD OF DIAGNOSIS DEVICE, AND RECORDING MEDIUM

CROSS-REFERENCE TO RELATED APPLICATIONS

This application is based upon and claims the benefit of priority of the prior Japanese Patent Application No. 2013-246802, filed on Nov. 28, 2013, the entire contents of which are incorporated herein by reference.

FIELD

The embodiments discussed herein are related to a diagnosis device, a control method of a diagnosis device, and a recording medium.

BACKGROUND

A field programmable gate array (FPGA) is an integrated circuit in which the circuit configuration information can be changed by a user after it is manufactured and is now used in a variety of devices.

FIG. 1 is a configuration diagram before an update of a conventional system.

A system 101 includes a micro processing unit (MPU) 111, a memory 121, an MPU flash memory (FMEM) 131, an FPGA FMEM 141, an FPGA 151, control devices 161-$i$ ($i=1$ to m), and a communication unit 171.

The MPU FMEM 131 stores a firm package 132.

The firm package 132 includes MPU firmware 133 and FPGA data 135.

The MPU firmware 133 is a program that gives instructions to perform an updating of the firm package 132, reconfiguration of the FPGA 151, etc.

The FPGA data 135 is information on circuits to be configured within the FPGA 151.

The FPGA FMEM 141 stores FPGA data 142.

The MPU 111 copies the FPGA data 135 within the MPU FMEM 131 to the FPGA FMEM 141. The FPGA data copied to the FPGA FMEM 141 is represented as the FPGA data 142. In other words, the contents of the FPGA data 135 and those of the FPGA data 142 are the same.

When the MPU 111 gives instructions to perform reconfiguration to the FPGA 151, the FPGA 151 reads the FPGA data 142 and configures circuits within the FPGA 151 based on the FPGA data 142.

When circuits are configured within the FPGA 151 based on the FPGA data 142 before an update, old circuits 181-1 to 181-$n$ are configured. Hereinafter, the old circuits 181-1 to 181-$n$ are represented as old circuits 1 to n, respectively.

The old circuits 1 to n are circuits that operate by normal system operation, such as control of the control device 161.

Further, within the FPGA 151, failures of elements (failed portions 1 and 2) exist in an area not used by the old circuits 1 to n.

The failed portions 1 and 2 exist in the area not used by the old circuits 1 to n, and therefore, the old circuits 1 to n operate normally.

In the case where the FPGA 151 is updated, the MPU 111 receives the new firm package 132 via the communication unit 171 and stores it in the MPU FMEM 131 and thus updates the firm package 132. Then, the MPU 111 reads the FPGA data 135, stores the FPGA data 142 in the FPGA FMEM 141, and reconfigures the FPGA 151.

FIG. 2 is a diagram illustrating a configuration after an update of the conventional system, and a diagnosis range.

When the FPGA 151 is reconfigured by using the FPGA data 142 after an update, within the FPGA 151, the old circuits 1 to n and new circuits 191-1 and 191-2 are configured. Hereinafter, the new circuits 191-1 and 191-2 are represented as new circuits 1 and 2, respectively.

The old circuits 1 to n are the same as the old circuits 1 to n already configured before an update. However, before an update, the old circuit 1 and the old circuit 2 were connected, but after an update, the old circuit 1 and the old circuit 2 are not connected and the old circuits 1 and 2 connect with the new circuit 1.

In contrast to the FPGA 151 before an update, the new circuits 1 and 2 are added to the FPGA 151 after an update.

The new circuit 1 connects with the old circuits 1 and 2 and the new circuit 2.

The new circuit 1 is a circuit that operates at the time of normal operation of the system 101.

The new circuit 2 operates only under specific conditions and does not operate at the time of normal operation of the system 101.

It is assumed that the new circuit 1 is configured in the area including the failed portion 1 and the new circuit 2 is configured in the area including the failed portion 2. In this case, the new circuits 1 and 2 will malfunction.

In the system 101 in which the above-described update is performed, the operation of the FPGA 151 is checked by checking the whole of the system 101 for the communication behavior during normal operation.

In this case, the range of the communication behavior check includes the old circuits 1 to n and the new circuit 1 that operate by normal operation.

In other words, whether there is an error is checked by causing the old circuits 1 to n and the new circuit 1 to perform normal operation.

The new circuit 1 is a circuit that operates by normal operation of the system 101, and therefore, if there is a failed portion in the area where the new circuit 1 is configured, it is possible to detect a failure from an error in the new circuit 1. In this case, it is preferable to replace the FPGA 151 with another during the maintenance work in which the above-mentioned update etc. is performed.

On the other hand, in the operation check during normal operation, the new circuit 2 that operates only under specific conditions is not included in the range of the operation check.

Consequently, even if a failed portion is included in the new circuit 2, it is not possible to detect a failure in the new circuit 2 by the conventional operation check.

The failure in the new circuit 2 is detected in the case where the new circuit 2 operates while the system is in operation after the maintenance work has been completed. Because of this, in the case where a failed portion is included in the new circuit 2, it is needed to stop the system 101 again and to replace the FPGA 151 with another.

As above, in the operation check at the time of the conventional update, not all the circuits within the FPGA are checked and a failure in the FPGA is detected while the system is in operation after the maintenance work has been completed, and therefore, there is a problem such that reliability of the system is degraded.

If all the elements within the FPGA are diagnosed before shipment of the system, normal operation is guaranteed for any circuit configuration. However, creating such a test program will generate an enormous number of development processes and cost. Furthermore, the documents such as Japanese Laid-open Patent Publication No. 2008-52389, Japanese Laid-open Patent Publication No. 2009-44473, etc. are well known.

SUMMARY

According to an aspect of the embodiments, a diagnosis device includes a storage unit, a circuit unit, and a processor.

The storage unit stores first circuit configuration information.

The circuit unit configures a first plurality of circuits based on the first circuit configuration information and a second plurality of circuits based on second circuit configuration information.

The processor updates the first circuit configuration information to the second circuit configuration information and diagnoses all the circuits newly added by the second circuit configuration information of the second plurality of circuits.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 10 is a flowchart of the diagnosis method according to the second embodiment;

FIG. 12 is a configuration diagram before an update of a system according to a third embodiment;

FIG. 15 is a flowchart of a diagnosis method according to the third embodiment; and FIG. 16 is a configuration diagram of an information processing apparatus (computer).

DESCRIPTION OF EMBODIMENTS

Hereinafter, embodiments are explained with reference to drawings.

First Embodiment

Figure 1:
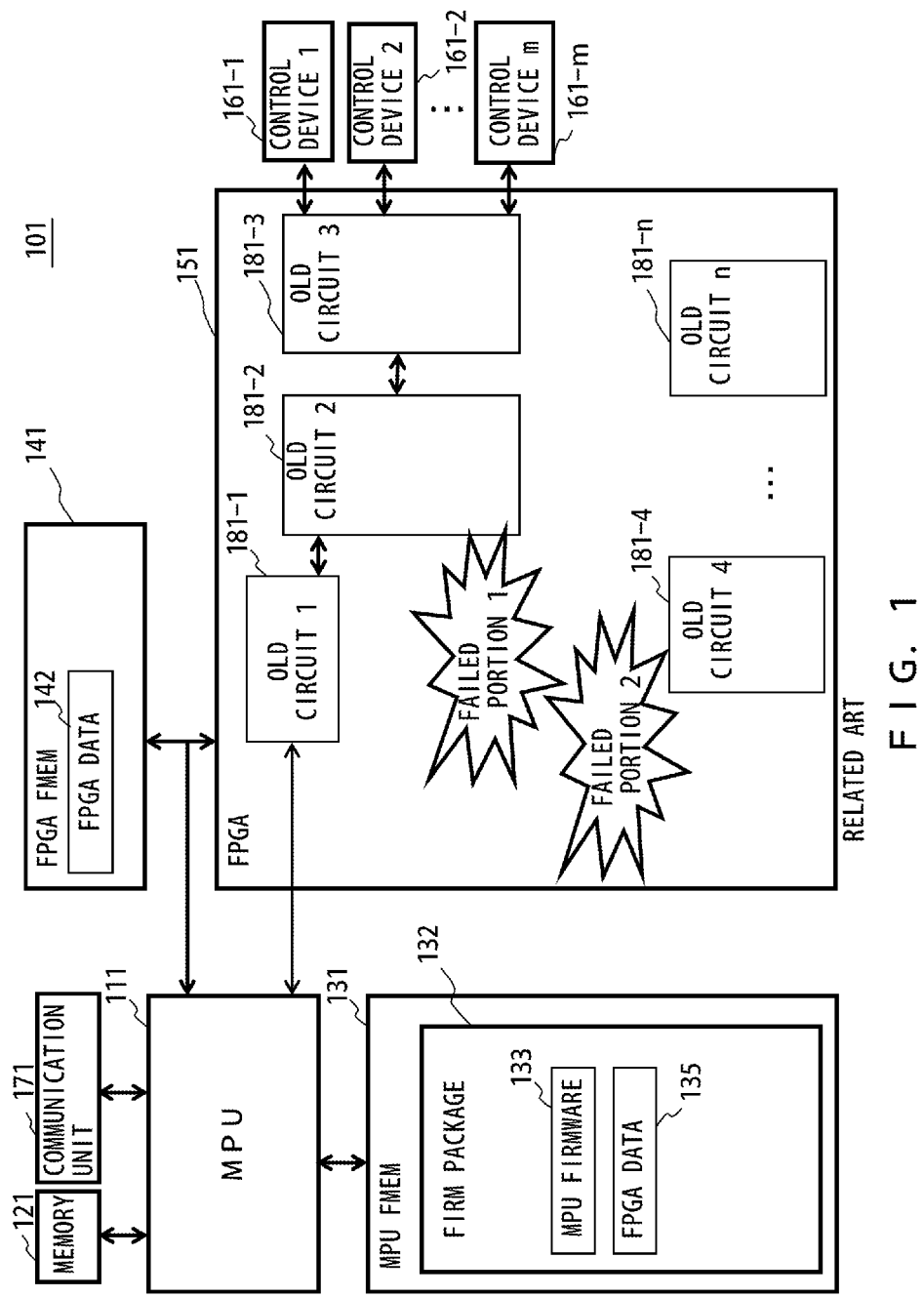
FIG. 1 is a configuration diagram before an update of a conventional system.
Figure 2:
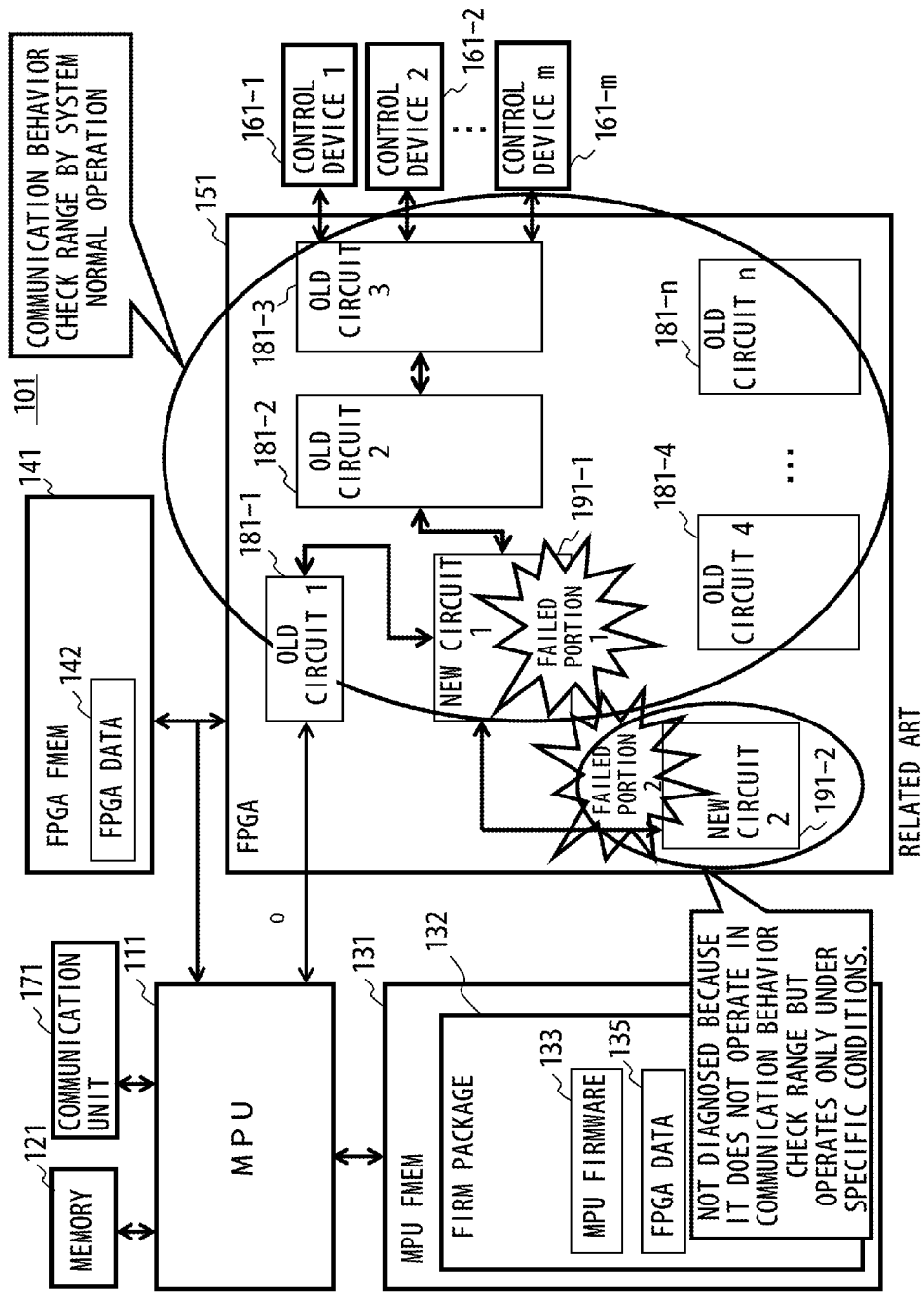
FIG. 2 is a diagram illustrating a configuration after an update of the conventional system and a diagnosis range.
Figure 3:
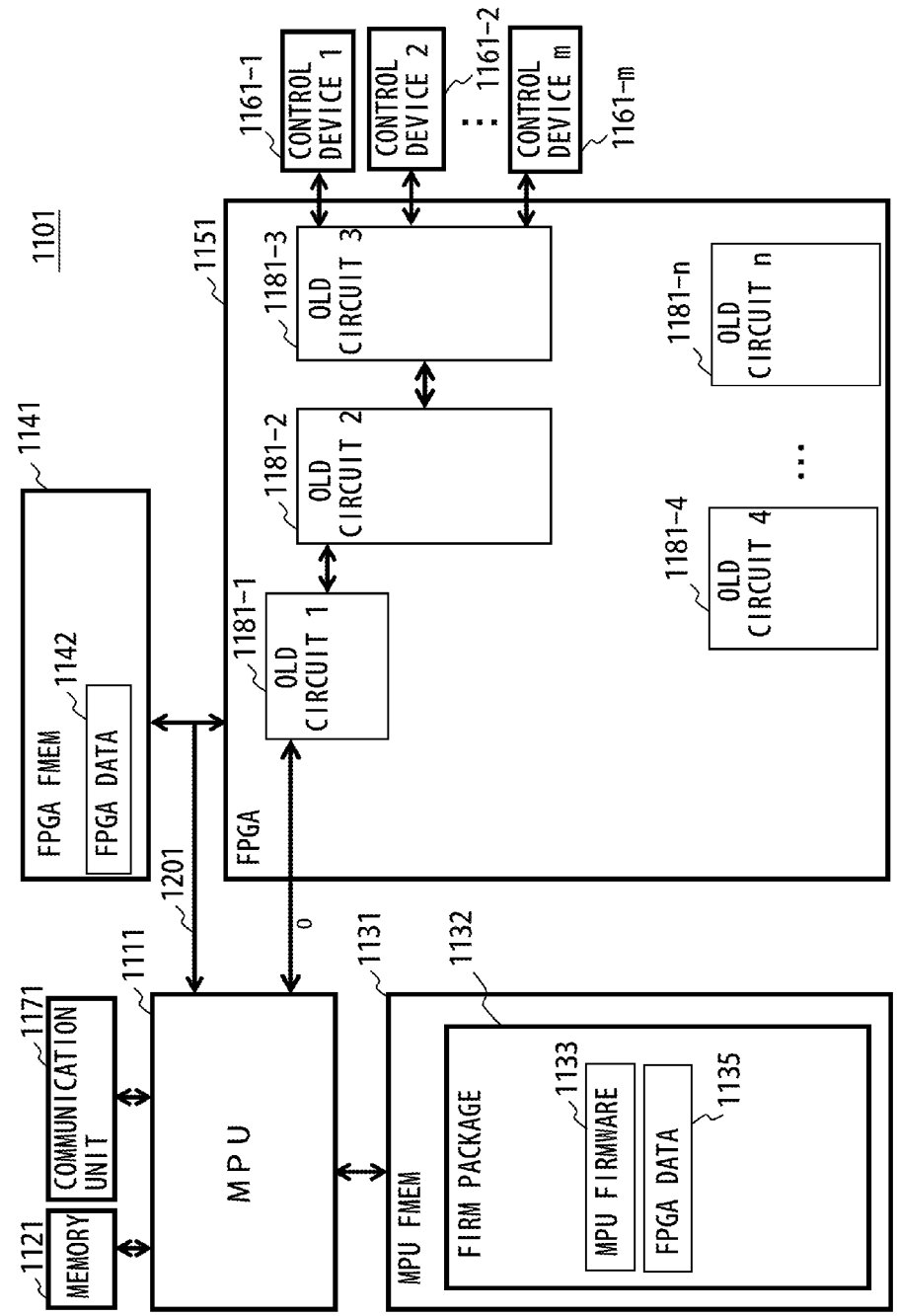
FIG. 3 is a configuration diagram before an update of a system according to a first embodiment.

FIG. 3 is a configuration diagram before an update of a system according to a first embodiment.

A system 1101 includes an MPU 1111, a memory 1121, an MPU flash memory (FMEM) 1131, an FPGA FMEM 1141, an FPGA 1151, control devices 1161-$i$ ($i$=1 to m), and a communication unit 1171.

The system 1101 is, for example, a computer, such as a system board and a server.

The MPU 1111 is a processing device that performs an updating of a firm package and diagnosis of the FPGA. The MPU 1111 performs an updating of a firm package 1132 and diagnosis of the FPGA 1151 by executing MPU firmware and FPGA diagnosis programs read onto the memory 1121.

The memory 1121 is a storage device that temporarily stores data and programs used in the system 1101. The memory 1121 is, for example, a random access memory (RAM).

The MPU FMEM 1131 stores the firm package 1132. The MPU FMEM 1131 is, for example, a nonvolatile memory.

The firm package 1132 includes MPU firmware 1133 and FPGA data 1135.

The MPU firmware 1133 is a program that gives instructions to perform an updating of the firm package 1132, reconfiguration of the FPGA 1151, etc.

The FPGA data 1135 is information on circuits to be configured within the FPGA 1151. The FPGA data 1135 includes information on the structures of the circuits to be configured within the FPGA 1151, the positions of the circuits, the connection relationship between the circuits, etc.

The FPGA FMEM 1141 stores FPGA data 1142. The FPGA FMEM 1141 is, for example, a nonvolatile memory.

The FPGA data 1142 is information on circuits to be configured within the FPGA 1151. The FPGA data 1142 is generated by the MPU 1111 copying the FPGA data 1135. Consequently, the contents of the FPGA data 1142 and those of the FPGA data 1135 are the same.

The FPGA 1151 configures circuits inside the FPGA 1151 based on the FPGA data 1142. The FPGA 1151 has a bridge function to establish communication between the MPU 1111 and the control device 1161. The FPGA 1151 is an example of the circuit unit.

In the first embodiment, old circuits 1181-1 to 1181-$n$ are configured based on the FPGA data 1142 before an update. Hereinafter, the old circuits 1181-1 to 1181-$n$ are represented as the old circuits 1 to n, respectively.

The old circuit 1 connects with the old circuit 2 and the MPU 1111.

The old circuit 2 connects with the old circuit 1 and the old circuit 3.

The old circuit 3 connects with the old circuit 2 and the control devices 1161-1 to 1161-$m$.

The control device 1161 is a device controlled by the MPU 1111 via the FPGA 1151.

The communication unit 1171 connects with a network, such as a local area network (LAN), and performs transmission and reception of data with an external device connected via the network.

Figure 4:
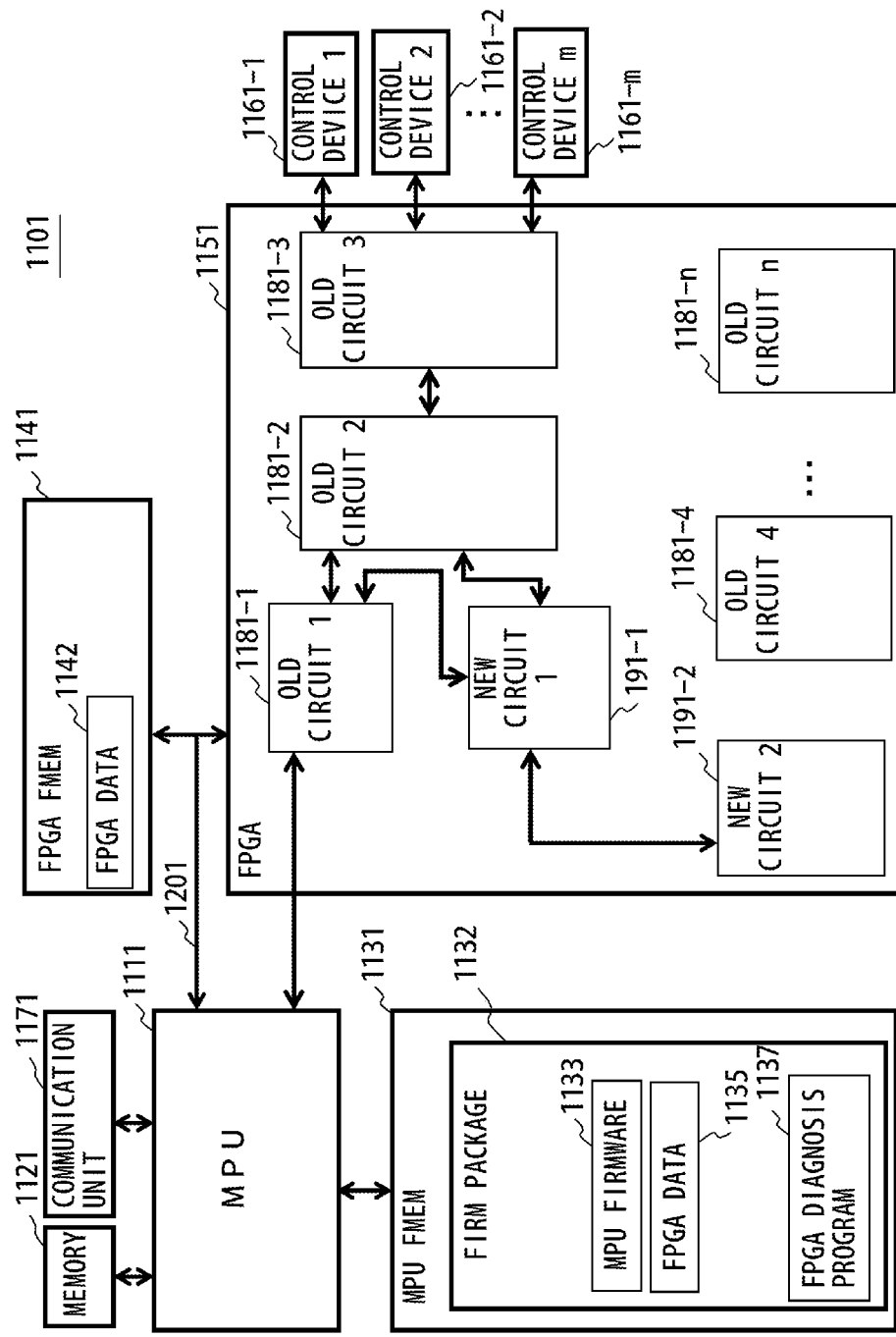
FIG. 4 is a configuration diagram after an update of the system according to the first embodiment.

FIG. 4 is a configuration diagram after an update of the system according to the first embodiment.

In the case where the FPGA 1151 is updated, the MPU 1111 receives the new firm package 1132 via the communication unit 1171 and stores it in the MPU FMEM 1131 and thus updates the firm package 1132. Then, the MPU 1111 reads the FPGA data 1135, stores the FPGA data 1142 in the FPGA FMEM 1141, and reconfigures the FPGA 1151.

FIG. 4 is a configuration diagram when the FPGA 1151 is reconfigured with the updated FPGA data 1135 after an update of the FPGA data 1135.

The firm package 1132 after an update includes the MPU firmware 1133, the FPGA data 1135, and an FPGA diagnosis program 1137.

The FPGA diagnosis program 1137 is a program that performs diagnosis of the FPGA 1151.

The FPGA diagnosis program 1137 only performs diagnosis of all the circuits (new circuits) added by an update and the circuits needed for the operation of the new circuits.

In the FPGA diagnosis program 1137, circuits to be diagnosed, diagnosis processing, etc., are set in advance.

In the FPGA 1151, the old circuits 1181-1 to 1181-*n* and new circuits 1191-1 and 1191-2 are configured based on the FPGA data 1142 after an update. Hereinafter, the old circuits 1181-1 to 1181-*n* are represented as the old circuits 1 to n, respectively, and the new circuits 1191-1 and 1191-2 as new circuits 1 and 2, respectively.

The old circuits 1 to n are the circuits already configured within the FPGA 1151, also in the FPGA 1151 before an update.

The new circuits 1 and 2 are circuits newly added in the FPGA 1151 after an update, in contrast to the FPGA 1151 before an update.

The old circuit 1 connects with the new circuit 1 and the MPU 1111.

The old circuit 2 connects with the new circuit 1 and the old circuit 3.

The old circuit 3 connects with the old circuit 2 and the control devices 1161-1 to 1161-*m*.

The new circuit 1 connects with the old circuits 1 and 2 and the new circuit 2. The new circuit 1 is a circuit that operates at the time of normal operation of the system 1101.

The new circuit 2 connects with the new circuit 1. The new circuit 2 operates only under specific conditions and does not operate at the time of normal operation of the system 1101.

The old circuits 1 to 3 are circuits needed for the operation of the new circuits 1 and 2. The circuit needed for the operation of the new circuit is a circuit that operates (is used) at the time of the operation of the new circuit. The circuit needed for the operation of the new circuit is, for example, a circuit that generates data used by the new circuit at the time of the operation and outputs the data to the new circuit, relays data input from another circuit to the new circuit, etc.

The old circuits 4 to n are circuits not needed for the operation of the new circuits 1 and 2. In other words, it is possible for the new circuits 1 and 2 to operate normally even if the circuits 4 to n are not in operation.

Figure 5:
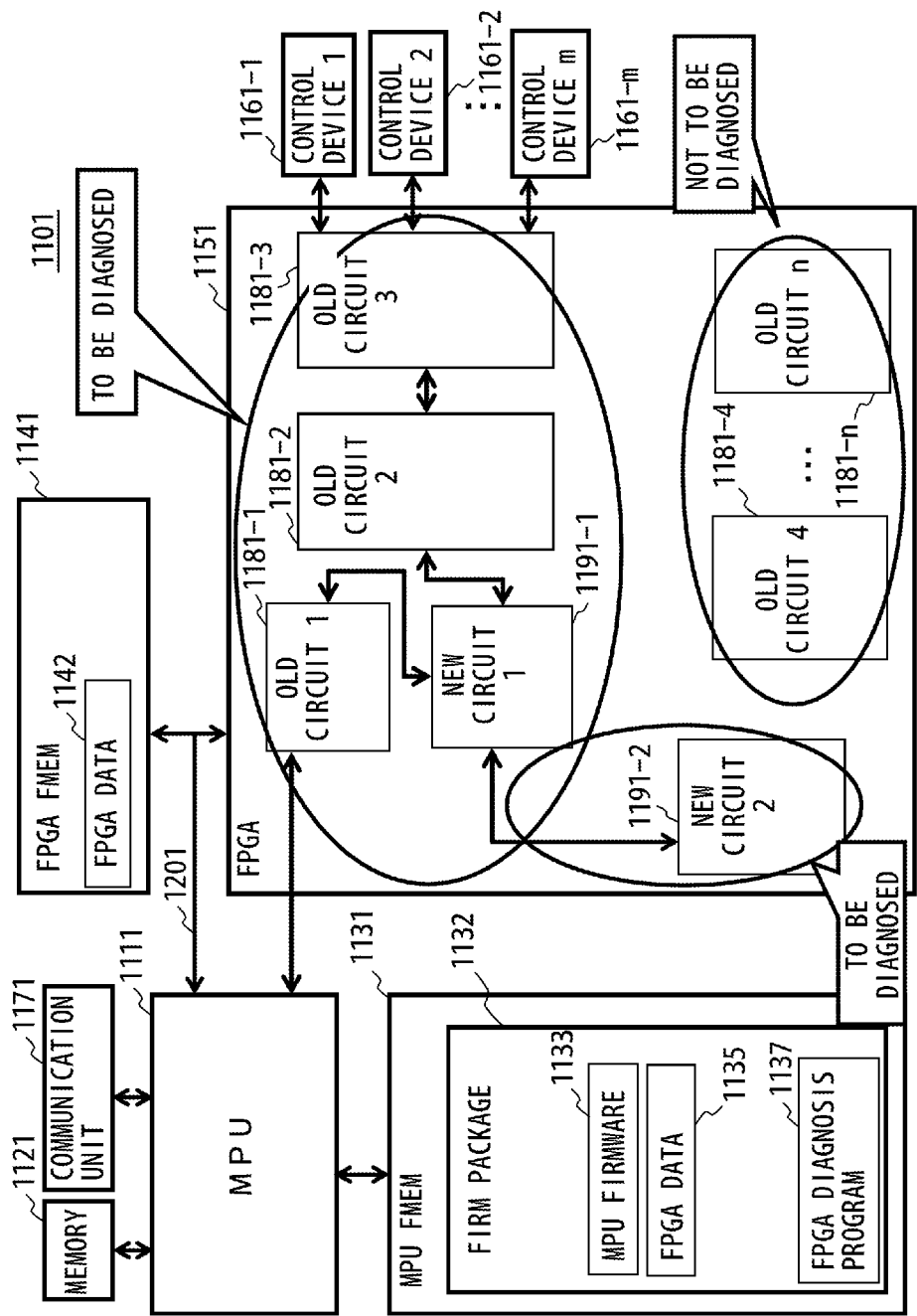
FIG. 5 is a diagram illustrating a diagnosis range in a diagnosis method according to the first embodiment.

FIG. 5 is a diagram illustrating a diagnosis range in a diagnosis method according to the first embodiment.

In the first embodiment, the FPGA diagnosis program 1137 only performs diagnosis of all the circuits (new circuits) added by an update and the circuits needed for the operation of the new circuits. The circuit needed for the operation of the new circuit is a circuit that operates (is used) at the time of the operation of the new circuit.

The FPGA diagnosis program 1137 does not perform diagnosis of the circuits not needed for the operation of the added circuits.

In other words, in the system 1101 in FIG. 4, the FPGA diagnosis program 1137 only performs diagnosis of the new circuits 1 and 2 and the old circuits 1 to 3. The FPGA diagnosis program 1137 does not perform diagnosis of the old circuits 4 to n. Because of this, it is possible to reduce the diagnosis time and to reduce the time during which the system 1101 is not in operation.

Figure 6:
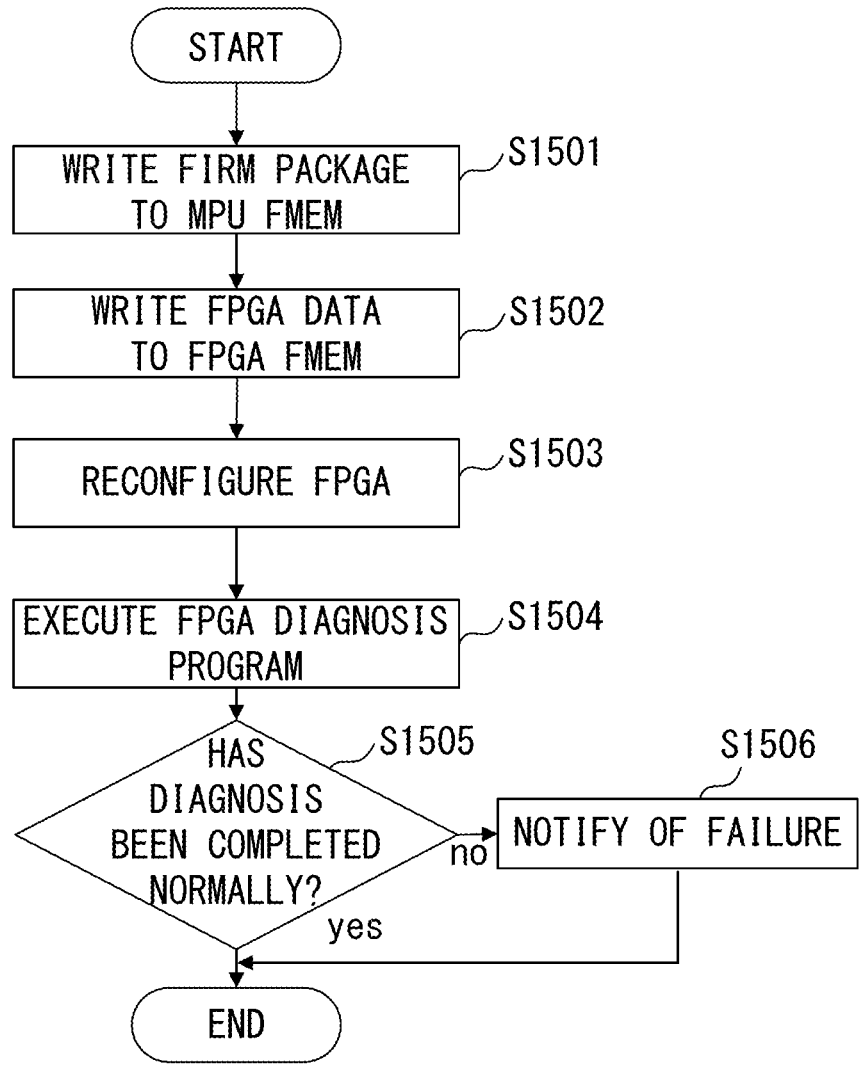
FIG. 6 is a flowchart of the diagnosis method according to the first embodiment.

FIG. 6 is a flowchart of diagnosis processing according to the first embodiment.

The FPGA 1151 has already been reconfigured based on the FPGA data 1142 and the configuration is that before the update illustrated in FIG. 3.

Further, it is assumed that the MPU 1111 has executed the MPU firmware 1133.

At step S1501, the MPU 1111 receives the firm package 1132 via the communication unit 1171 from an external device connected with the system 1101 via the network and writes the firm package 1132 to the MPU FMEM 1131.

At step S1502, the MPU 1111 reads the FPGA data 1135, serves as a bus master via a serial bus 1201, and writes it to the FPGA FMEM 1141. The FPGA data written to the FPGA FMEM 1141 as described above is represented as the FPGA data 1142.

At step S1503, the MPU 1111 gives instructions to perform reconfiguration to the FPGA 1151. Upon receipt of the instructions, the FPGA 1151 performs reconfiguration. In detail, the FPGA 1151 reads the FPGA data 1142 and configures the old circuits 1 to n and the new circuits 1 and 2 based on the FPGA data 1142. It may also be possible for the FPGA 1151 to receive the FPGA data 1135 from the MPU FMEM 1131 via the MPU 1111 and to configure the old circuits 1 to n and the new circuits 1 and 2 based on the FPGA data 1135. In such a case, the processing to write the FPGA data 1135 to the FPGA FMEM 1141 at step S1502 may be omitted.

At step S1504, the MPU 1111 executes the FPGA diagnosis program 1137. By means of the FPGA diagnosis program 1137, the MPU 1111 diagnoses the new circuits 1 and 2 and the old circuits 1 to 3. In the diagnosis processing, for example, predetermined commands and data are input to a circuit to be diagnosed and whether or not the circuit operates normally is checked. In the case where the circuit to be diagnosed operates anomalously when the predetermined commands and data are input to the circuit to be diagnosed, an error is detected.

At step S1505, in the case where the diagnosis is completed normally (i.e., when no error is detected in the new circuits 1 and 2 and the old circuits 1 to 3), the processing is exited, and in the case where the diagnosis is not completed normally (i.e., when an error is detected in any of the new circuits 1 and 2 and the old circuits 1 to 3), the control proceeds to step S1506.

At step S1506, the MPU 1111 makes a notification of a failure. For example, the MPU 1111 produces a display to the effect that an error is detected on a display unit (not illustrated) of the system 1101 or notifies an external device connected with the system 1101 via the network of the error.

According to the system of the first embodiment, by diagnosing all the circuits newly added by an update, an error due to a potential failure is no longer detected while the system is in operation and reliability of the system is improved.

Further, according to the system of the first embodiment, by reducing the diagnosis time by limiting the diagnosis range, it is possible to reduce the time during which the system is not in operation.

Second Embodiment

Figure 7:
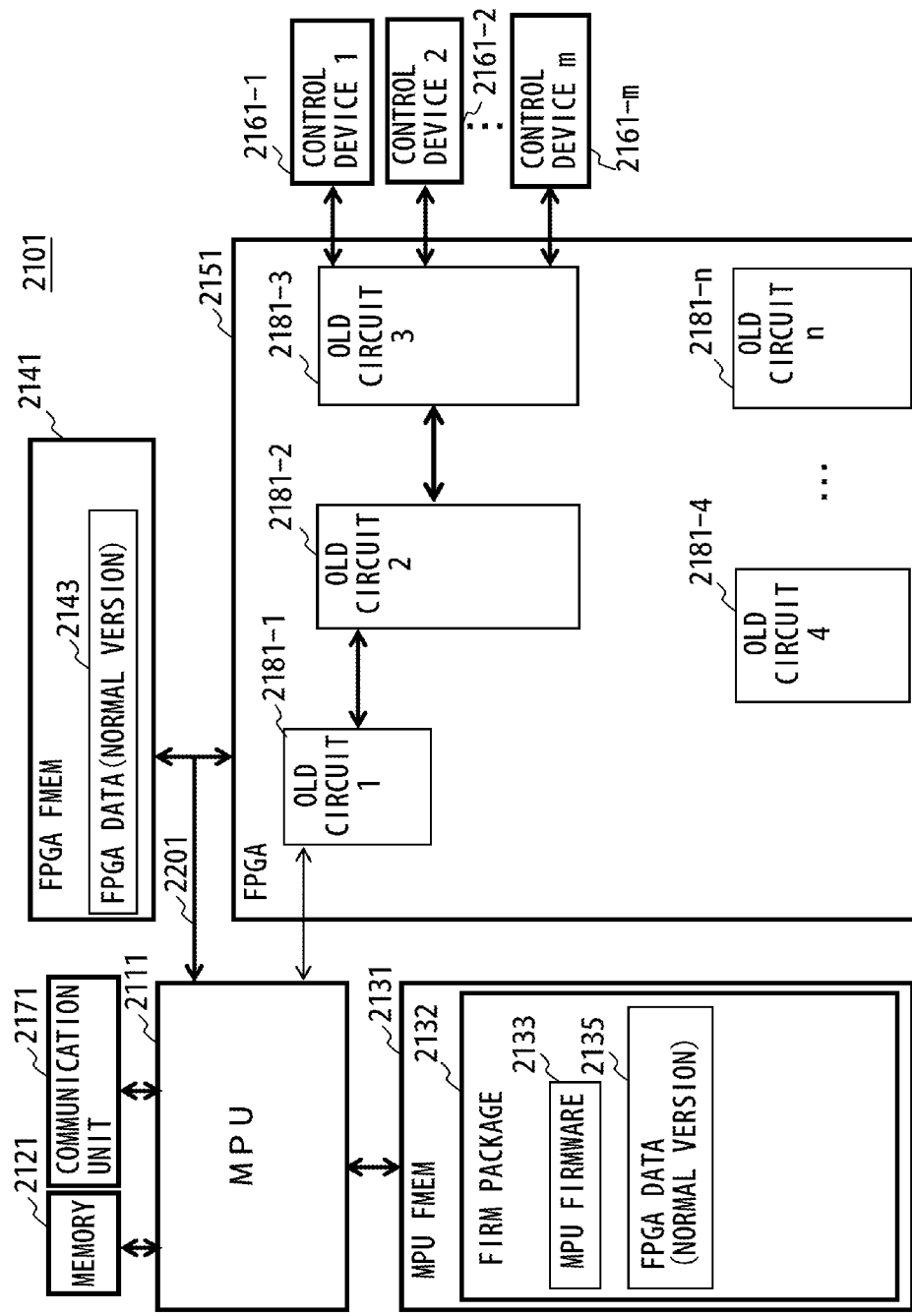
FIG. 7 is a configuration diagram before an update of a system according to a second embodiment.

FIG. 7 is a configuration diagram before an update of a system according to a second embodiment.

A system 2101 includes an MPU 2111, a memory 2121, and MPU flash memory (FMEM) 2131, an FPGA FMEM 2141, an FPGA 2151, control devices 2161-*i* (i=1 to and a communication unit 2171.

The system 2101 is, for example, a computer, such as a system board or a server.

The MPU FMEM 2131 stores a firm package 2132. The MPU FMEM 2131 is, for example, a nonvolatile memory.

The firm package 2132 includes MPU firmware 2133 and FPGA data (normal version) 2135.

The MPU firmware 2133 is a program that gives instructions to perform an updating of the firm package 2132, reconfiguration of the FPGA 2151, etc.

The FPGA data 2135 is information on circuits to be configured within the FPGA 2151. The FPGA data 2135 includes information on the structures of the circuits to be configured within the FPGA 2151, the positions of the circuits, the connection relationship between the circuits, etc.

The MPU 2111, the memory 2121, the control devices 2161-*i*, and the communication unit 2171 have the same functions as those of the MPU 1111, the memory 1121, the control devices 1161-*i*, and the communication unit 1171 of the first embodiment, respectively, and therefore, explanation is omitted.

The FPGA FMEM 2141 stores FPGA data (normal version) 2143. The FPGA FMEM 2141 is, for example, a nonvolatile memory.

The FPGA data 2143 (normal version) is information on circuits to be configured within the FPGA 2151. The FPGA data 2143 (normal version) is generated by the MPU 2111 copying the FPGA data (normal version) 2135. Consequently, the contents of the FPGA data (normal version) 2143 and those of the FPGA data (normal version) 2135 are the same.

The FPGA 2151 configures circuits inside the FPGA 2151 based on the FPGA data (normal version) 2143. The FPGA 2151 has abridge function to establish communication between the MPU 2111 and the control device 2161. The FPGA 2151 is an example of the circuit unit.

In the second embodiment, based on the FPGA data (normal version) 2143 before an update, old circuits 2181-1 to 2181-*n* are configured. Hereinafter, the old circuits 2181-1 to 2181-*n* are represented as the old circuits 1 to n, respectively.

The old circuits 2181-1 to 2181-*n* have the same functions and configurations as those of the old circuits 1181-1 to 1181-*n* before an update of the first embodiment, respectively, and therefore, explanation is omitted.

Figure 8:
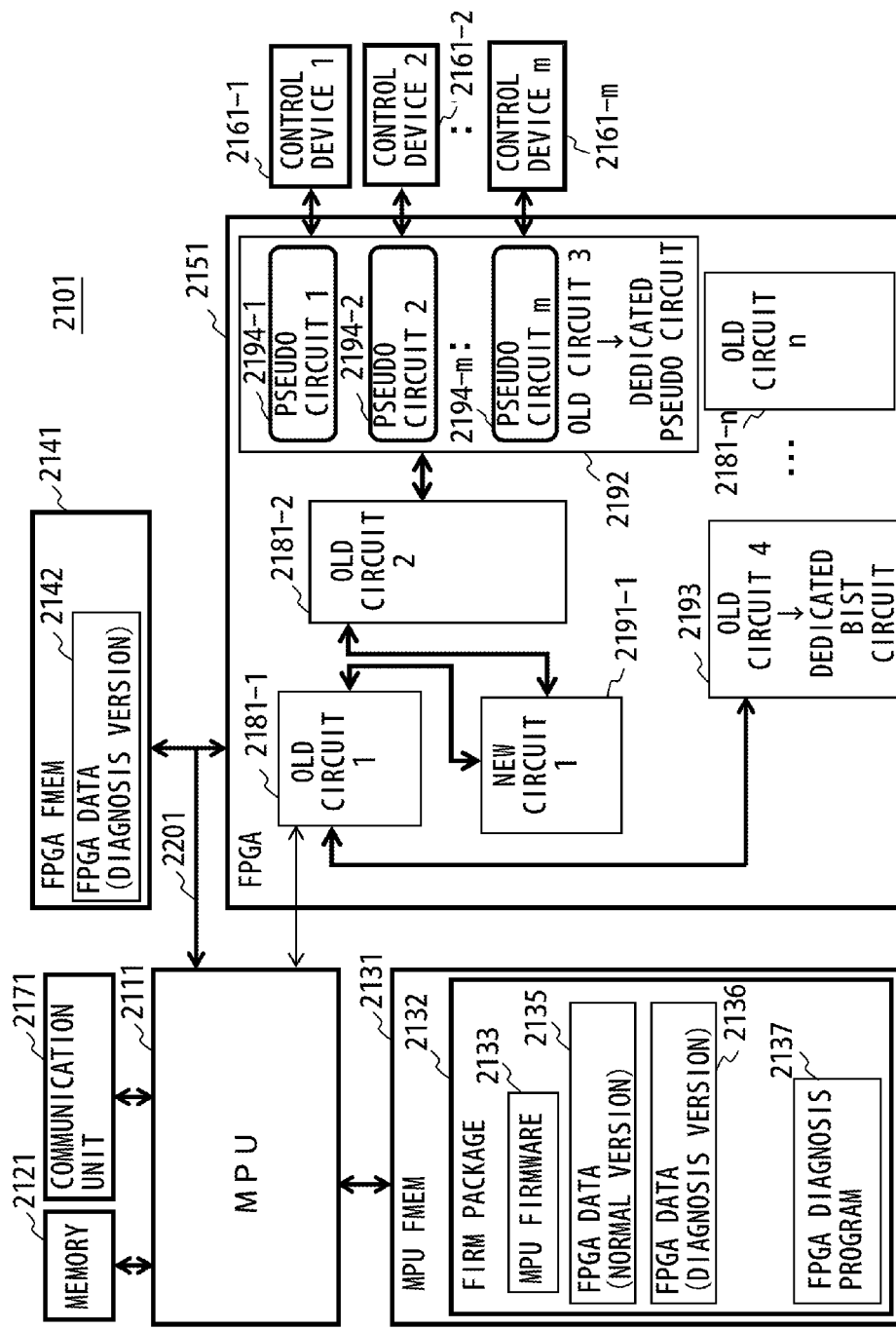
FIG. 8 is a configuration diagram at the time of diagnosis after an update of the system according to the second embodiment.

FIG. 8 is a configuration diagram at the time of diagnosis after an update of the system according to the second embodiment.

In the case where the FPGA 2151 is updated, the MPU 2111 receives the new firm package 2132 via the communication unit 2171 and stores it in the MPU FMEM 2131 and thus updates the firm package 2132. Then, the MPU 2111 reads FPGA data (diagnosis version) 2136, stores FPGA data (diagnosis version) 2142 in the FPGA FMEM 2141, and reconfigures the FPGA 2151.

FIG. 8 is a configuration diagram in which the FPGA 2151 is reconfigured with the updated FPGA data (diagnosis version) 2136 after an update of the firm package 2132.

The firm package 2132 after an update includes the MPU firmware 2133, the FPGA data (normal version) 2135, the FPGA data (diagnosis version) 2136, and an FPGA diagnosis program 2137.

The MPU firmware 2133 is a program that gives instructions to perform an updating of the firm package 2132, reconfiguration of the FPGA 2151, etc.

The FPGA data (normal version) 2135 is information on circuits to be configured within the FPGA 2151. The FPGA data 2135 (normal version) includes information on the structures of the circuits to be configured within the FPGA 2151, the positions of the circuits, the connection relationship between the circuits, etc.

The FPGA data (diagnosis version) 2136 is information on circuits to be configured within the FPGA 2151. The FPGA data 2136 (diagnosis version) includes information on the structures of the circuits to be configured within the FPGA 2151, the positions of the circuits, the connection relationship between the circuits, etc.

The FPGA diagnosis program 2137 is a program that gives instructions to start diagnosis to a dedicated built-in self test (BIST) circuit 2193 configured to perform diagnosis of the FPGA 2151, receives notification to the effect that the diagnosis has been completed, receives notification to the effect that an error has been detected, etc.

The FPGA FMEM 2141 stores the FPGA data (diagnosis version) 2142. The FPGA FMEM 2141 is, for example, a nonvolatile memory.

The FPGA data 2142 (diagnosis version) is information on circuits to be configured within the FPGA 2151. The FPGA data 2142 (diagnosis version) is generated by the MPU 2111 copying the FPGA data (diagnosis version) 2136. Consequently, the contents of the FPGA data (diagnosis version) 2142 and those of the FPGA data (diagnosis version) 2136 are the same.

The FPGA 2151 configures circuits inside the FPGA 2151 based on the FPGA data (diagnosis version) 2142.

In the second embodiment, based on the FPGA data (diagnosis version) 2142 after an update, the old circuits 2181-1, 2181-2, and 2181-5 to 2181-*n*, a new circuit 2191-1, a dedicated pseudo circuit 2192, and the dedicated BIST circuit 2193 are configured. Hereinafter, the old circuits 2181-1, 2181-2, and 2181-5 to 2181-*n* are represented as the old circuits 1, 2, and 5 to n, respectively, and the new circuit 2191-1 as the new circuit 1.

The old circuit 1 connects with the new circuit 1 and the MPU 2111.

The old circuit 2 connects with the new circuit 1 and the dedicated pseudo circuit 2192.

The old circuits 1, 2, and 5 to n are the circuits already configured within the FPGA 2151, also in the FPGA 2151 before an update.

The new circuit 1 is a circuit newly added in the FPGA 2151 after an update, in contrast to the FPGA 2151 before an update in FIG. 7.

The dedicated pseudo circuit 2192 connects with the old circuit 2.

The dedicated pseudo circuit 2192 is configured in the area where the old circuit 3 having the interface with the control devices 2161-1 to 2161-*m* was configured in the FPGA 2151 before an update.

The dedicated pseudo circuit 2192 has the functions of the old circuit 3 and the interface function equivalent to that of the control devices 2161-1 to 2161-*m*.

The dedicated pseudo circuit 2192 includes pseudo circuits 2194-1 to 2194-*m*. Hereinafter, the pseudo circuits 2194-1 to 2194-*m* are represented as pseudo circuits 1 to m, respectively.

The pseudo circuits 1 to m perform an interface operation equivalent to that of the control devices 2161-1 to 2161-*m*. In other words, the pseudo circuits 1 to m perform an operation equivalent to the response of the control devices 2161-1 to 2161-*m* in the case where the control devices 2161-1 to 2161-*m* are accessed.

For example, when making an attempt to access the control devices 2161-1 to 2161-*m* at the time of diagnosis of the new circuit 1, the dedicated pseudo circuit 2192 performs a response equivalent to that in the case where the pseudo circuits 1 to m access the control devices 2161-1 to 2161-*m* without accessing the control devices 2161-1 to 2161-*m*.

In other words, the pseudo circuits 1 to m perform an operation equivalent to the response of the control devices 2161-1 to 2161-*m* when accessing the control devices 2161-1 to 2161-*m* via the old circuit 3.

Consequently, from the MPU 2111, the old circuits 1 and 2, the new circuit 1, and the dedicated BIST circuit 2193, it seems as if the old circuit 3 is configured in place of the dedicated pseudo circuit 2192 within the FPGA 2151 and the old circuit 3 is connected with the control devices 2161-1 to 2161-*m*. Consequently, it is possible to perform diagnosis equivalent to that in the case where the old circuit 3 is connected with the control devices 2161-1 to 2161-*m* in the FPGA 2151 in FIG. 8.

The dedicated BIST circuit 2193 is a circuit configured to perform diagnosis of the FPGA 2151. It is possible for the dedicated BIST circuit 2193 configured by hardware to perform diagnosis at a speed higher than that at which the MPU 1111 in the first embodiment performs diagnosis of the FPGA 1151 by executing the diagnosis program 1137.

The dedicated BIST circuit 2193 is configured in the area where the old circuit 4 existed in the FPGA 2151 before an update.

The area where the dedicated BIST circuit 2193 is configured is not limited to the area where the old circuit 4 existed before an update, and may be any area as long as the new circuit 1 and the circuits that operate (are used) at the time of the operation of the new circuit are not affected.

The new circuit 1 connects with the old circuit 1 and the old circuit 2. The new circuit 1 is a circuit that operates at the time of normal operation of the system 2101.

Further, the old circuits 1 to 3 are the circuits needed for the operation of the new circuit 1. The circuit needed for the operation of the new circuit is a circuit that operates (is used) at the time of the operation of the new circuit. The circuit needed for the operation of the new circuit is a circuit that generates data used by the new circuit at the time of the operation and outputs the data to the new circuit, relays data input from another circuit to the new circuit, etc.

The old circuits 5 to n are the circuits not needed for the operation of the new circuit 1. In other words, it is possible for the new circuit 1 to perform normal operation even if the circuits 5 to n are not in operation.

Figure 9:
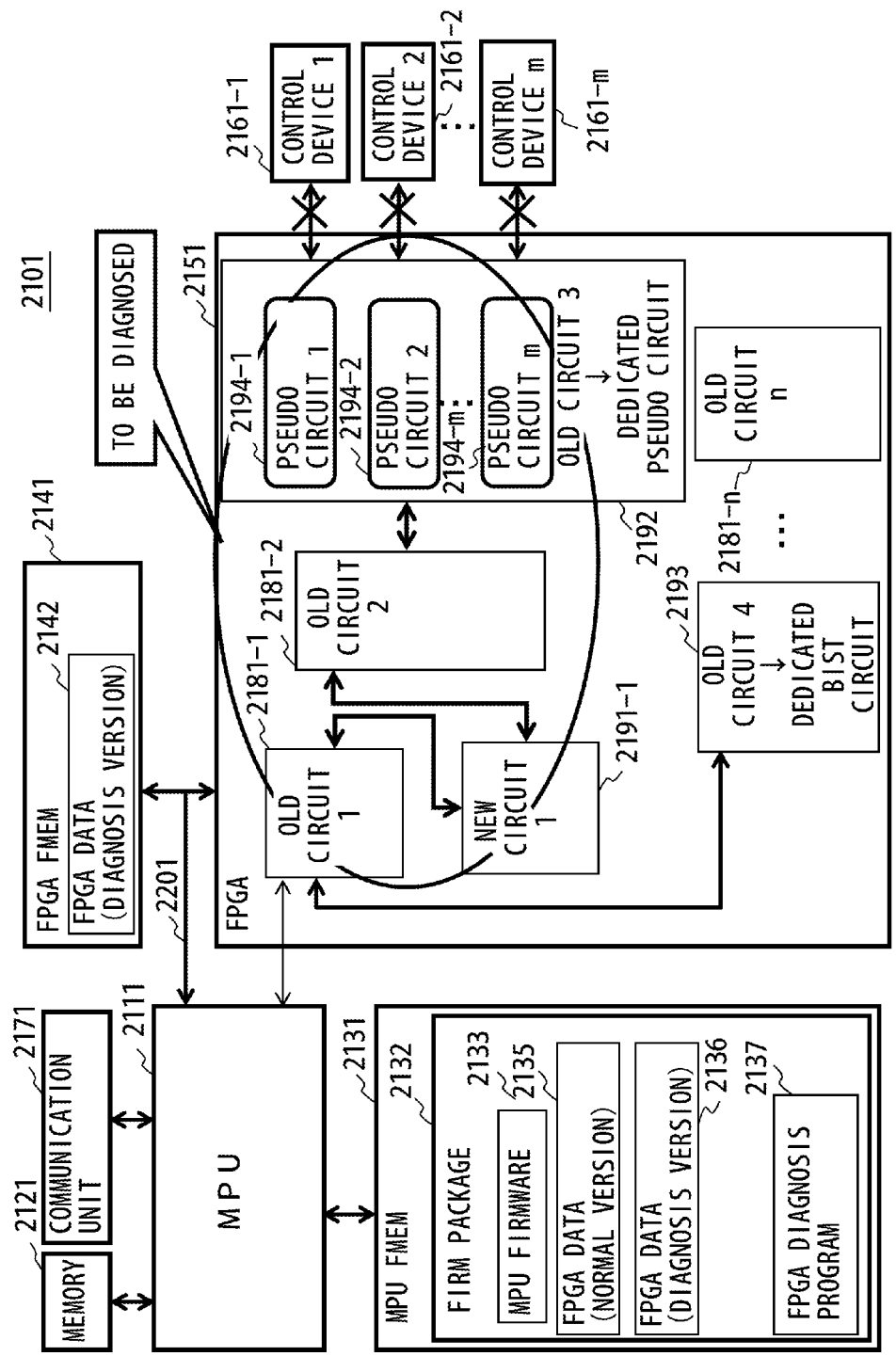
FIG. 9 is a diagram illustrating a diagnosis range in a diagnosis method according to the second embodiment.

FIG. 9 is a diagram illustrating a diagnosis range in a diagnosis method according to the second embodiment.

In the second embodiment, the dedicated BIST circuit 2193 only performs diagnosis of all the circuits (new circuits) added by an update except for itself and the circuits needed for the operation of the new circuits. The circuit needed for the operation of the new circuit is a circuit that operates (is used) at the time of the operation of the new circuit.

Further, the dedicated BIST circuit 2193 does not perform diagnosis of the circuits not needed for the operation of the added circuits.

In other words, in the system 2101 in FIG. 8, the dedicated BIST circuit 2193 only performs diagnosis of the new circuit 1, the old circuits 1 and 2, and the dedicated pseudo circuit 2192. The dedicated BIST circuit 2193 does not perform diagnosis of the old circuits 5 to n. Because of this, it is possible to reduce the diagnosis time and to reduce the time during which the system 2101 is not in operation.

Further, by using the dedicated pseudo circuit 2192, the control device 2161 is not caused to operate, and therefore, it is possible to reduce the diagnosis time.

FIG. 10 is a flowchart of the diagnosis method according to the second embodiment.

The FPGA 2151 has already been reconfigured based on the FPGA data (normal version) 2143 and the configuration is that before an update illustrated in FIG. 7.

Further, it is assumed that the MPU 2111 has executed the MPU firmware 2133.

At step S2501, the MPU 2111 receives the firm package 2132 via the communication unit 2171 from an external device connected with the system 2101 via the network and writes the firm package 2132 to the MPU FMEM 2131.

At step S2502, the MPU 2111 reads the FPGA data (diagnosis version) 2136, serves as a bus master via a serial bus 2201, and writes this to the FPGA FMEM 2141. The FPGA data (diagnosis version) written to the FPGA FMEM 2141 as described above is represented as the FPGA data 2142.

At step S2503, the MPU 2111 gives instructions to perform reconfiguration to the FPGA 2151. Upon receipt of the instructions, the FPGA 2151 performs reconfiguration. In detail, the FPGA 2151 reads the FPGA data (diagnosis version) 2142 and configures the old circuits 1 and 2, the new circuit 1, the dedicated pseudo circuit 2192, and the dedicated BIST circuit 2193 based on the FPGA data (diagnosis version) 2142. Further, it may also be possible for the FPGA 2151 to receive the FPGA data (diagnosis version) 2136 from the MPU FMEM 2131 via the MPU 2111 and to configure the old circuits 1 and 2, the new circuit 1, the dedicated pseudo circuit 2192, and the dedicated BIST circuit 2193 based on the FPGA data (diagnosis version) 2136. In such a case, the processing to write the FPGA data (diagnosis version) 2136 to the FPGA FMEM 2141 at step S2502 may be omitted.

At step S2504, the MPU 2111 executes the FPGA diagnosis program 2137. When executing the FPGA diagnosis program 2137, the MPU 2111 gives instructions to start diagnosis to the dedicated BIST circuit 2193.

The dedicated BIST circuit 2193 having received the instructions diagnoses the new circuit 1, the old circuits 1 and 2, and the dedicated pseudo circuit 2192. In the diagnosis processing, predetermined commands and data are input to a circuit to be diagnosed and whether or not the circuit operates normally is checked.

At step S2505, in the case where the diagnosis is completed normally, the dedicated BIST circuit 2193 notifies the MPU 2111 that the diagnosis has been completed, and the control proceeds to step S2506. In the case where the diagnosis is not completed normally (i.e., when an error is detected in any of the new circuit 1, the old circuits 1 and 2, and the dedicated pseudo circuit 2192), the dedicated BIST circuit 2193 notifies the MPU 2111 that an error has been detected, and the control proceeds to step S2508.

At step S2506, the MPU 2111 reads the FPGA data (normal version) 2135, serves as a bus master via the serial bus 2201, and writes it to the FPGA FMEM 2141. The FPGA data (normal version) written to the FPGA FMEM 2141 is represented as the FPGA data (normal version) 2143.

Figure 11:
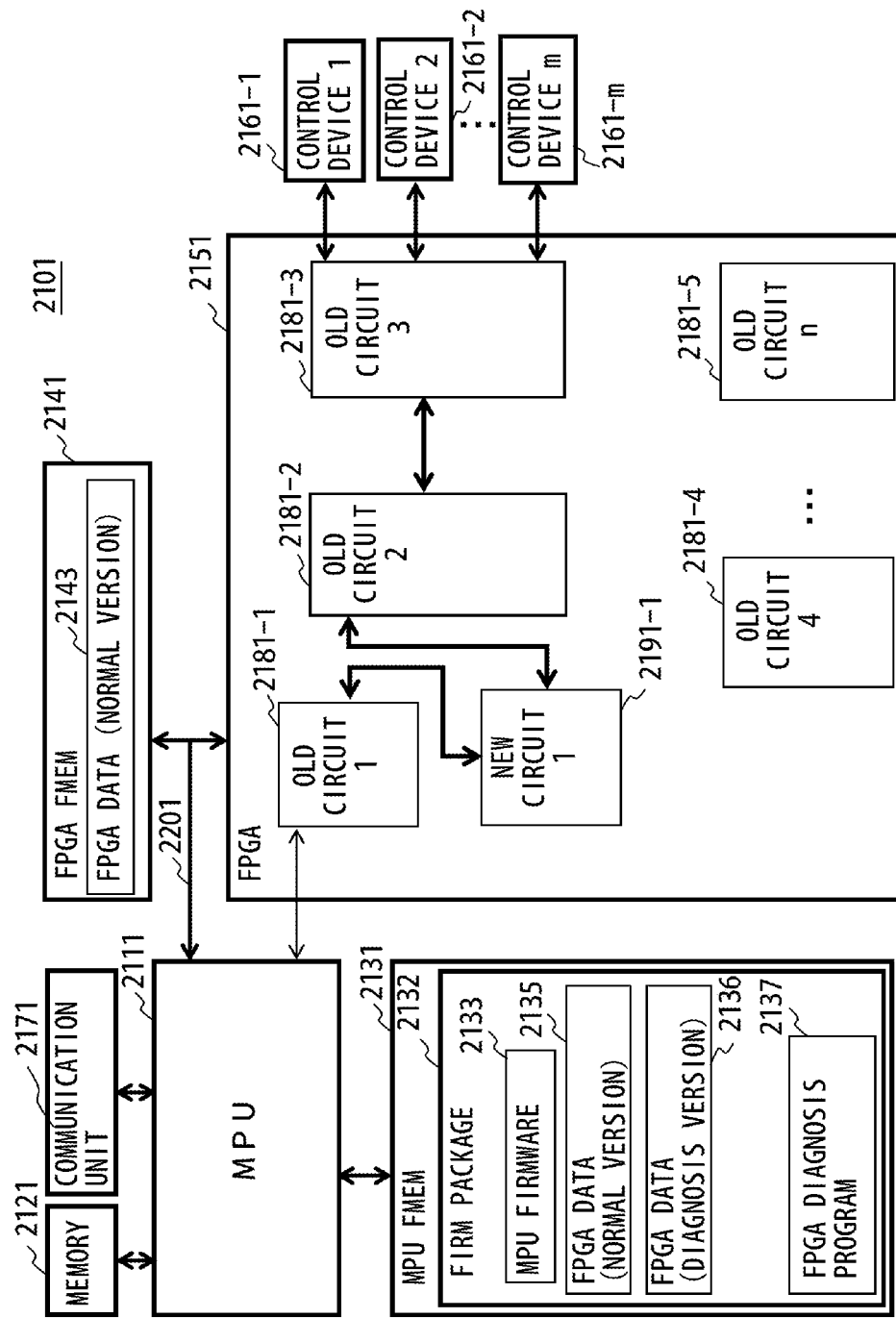
FIG. 11 is a configuration diagram after diagnosis after an update of the system according to the second embodiment.

At step S2507, the MPU 2111 gives instructions to perform reconfiguration to the FPGA 2151. Upon receipt of the instructions, the FPGA 2151 performs reconfiguration. In detail, the FPGA 2151 reads the FPGA data (normal version) 2143 and configures circuits based on the FPGA data (normal version) 2143. Due to this, the FPGA 2151 as illustrated in FIG. 11 is configured. Further, it may also be possible for the FPGA 2151 to receive the FPGA data (normal version) 2135 from the MPU FMEM 2131 via the MPU 2111 and to configure circuits based on the FPGA data (normal version) 2135. In such a case, the processing to write the FPGA data (normal version) 2136 to the FPGA FMEM 2141 at step S2506 may be omitted.

FIG. 11 is a configuration diagram after the diagnosis after an update of the system according to the second embodiment.

In the FPGA 2151 in FIG. 11, based on the FPGA data (normal version) 2143, the old circuits 2181-1 to 2181-*n* and the new circuit 2191-1 are configured. Hereinafter, the old circuits 2181-1 to 2181-*n* are represented as the old circuits 1 to n, respectively, and the new circuit 2191-1 as the new circuit 1.

The old circuits 1 to n are the circuits that are already configured within the FPGA 2151, also in the FPGA 2151 before an update.

The new circuit 1 is a circuit newly added in the FPGA 2151 after an update, in contrast to the FPGA 2151 before an update in FIG. 7. Further, the new circuit 1 is the same circuit as the new circuit 1 at the time of the diagnosis in FIG. 8.

Returning to FIG. 10, at step S2508, the MPU 2111 makes a notification of a failure. For example, the MPU 2111 produces a display to the effect that an error is detected on the display unit (not illustrated) of the system 2101 or notifies an external device connected with the system 2101 via the network of the error.

According to the system of the second embodiment, by diagnosing all the circuits that are newly added by an update, an error due to the potential failure is no longer detected while the system is in operation, and therefore, reliability of the system is improved.

According to the system of the second embodiment, by configuring the BIST circuit that performs diagnosis within the FPGA and by the BIST circuit performing diagnosis, it is possible to reduce the diagnosis time.

In the case where it takes a very long time to operate the control device, the time taken by the diagnosis of the FPGA also increases, and therefore, there is a problem such that the time during which the maintenance of the system is not performed increases considerably.

According to the system of the second embodiment, it is possible to reduce the diagnosis time by not allowing the control device to operate during the time of diagnosis and by using a dedicated pseudo circuit that performs an operation equivalent to the interface operation of the control device.

Third Embodiment

FIG. 12 is a configuration diagram before an update of a system according to a third embodiment.

A system 3101 includes an MPU 3111, a memory 3121, an MPU flash memory (FMEM) 3131, an FPGA FMEM 3141, an FPGA 3151, control devices 3161-*i* (i=1 to m), and a communication unit 3171.

The MPU 3111, the memory 3121, the control devices 3161-*i*, and the communication unit 3171 have the same functions and configurations as those of the MPU 1111, the memory 1121, the control devices 1161-*i*, and the communication unit 1171 of the first embodiment, respectively, and therefore, explanation is omitted.

The MPU FMEM 3131 stores a firm package 3132. The firm package 3132 includes MPU firmware 3133 and FPGA data 3134.

The MPU FMEM 3131, the MPU firmware 3133, and the FPGA data 3134 have the same functions and configurations as those of the MPU FMEM 1131, the MPU firmware 1133, and the FPGA data 1134 of the first embodiment, respectively, and therefore, explanation is omitted.

The FPGA FMEM 3141 stores FPGA data 3144. The FPGA FMEM 3141 is, for example, a nonvolatile memory.

The FPGA data 3144 is information on circuits to be configured within the FPGA 3151. The FPGA data 3144 is generated by the MPU 3111 copying the FPGA data 3141. Consequently, the contents of the FPGA data 3144 and those of the FPGA data 3134 are the same.

The FPGA 3151 configures circuits inside the FPGA 3151 based on the FPGA data 3144. The FPGA 3151 has a bridge function to establish communication between the MPU 3111 and the control device 3161. The FPGA 3151 is an example of the circuit unit.

In the third embodiment, based on the FPGA data 3144 before an update, old circuits 3181-1 to 3181-*n* are configured. Hereinafter, the old circuits 3181-1 to 3181-*n* are represented as the old circuits 1 to n, respectively.

The old circuits 3181-1 to 3181-*n* have the same functions and configurations as those of the old circuits 1181-1 to 1181-*n* before an update of the first embodiment, respectively, and therefore, explanation is omitted.

Figure 13:
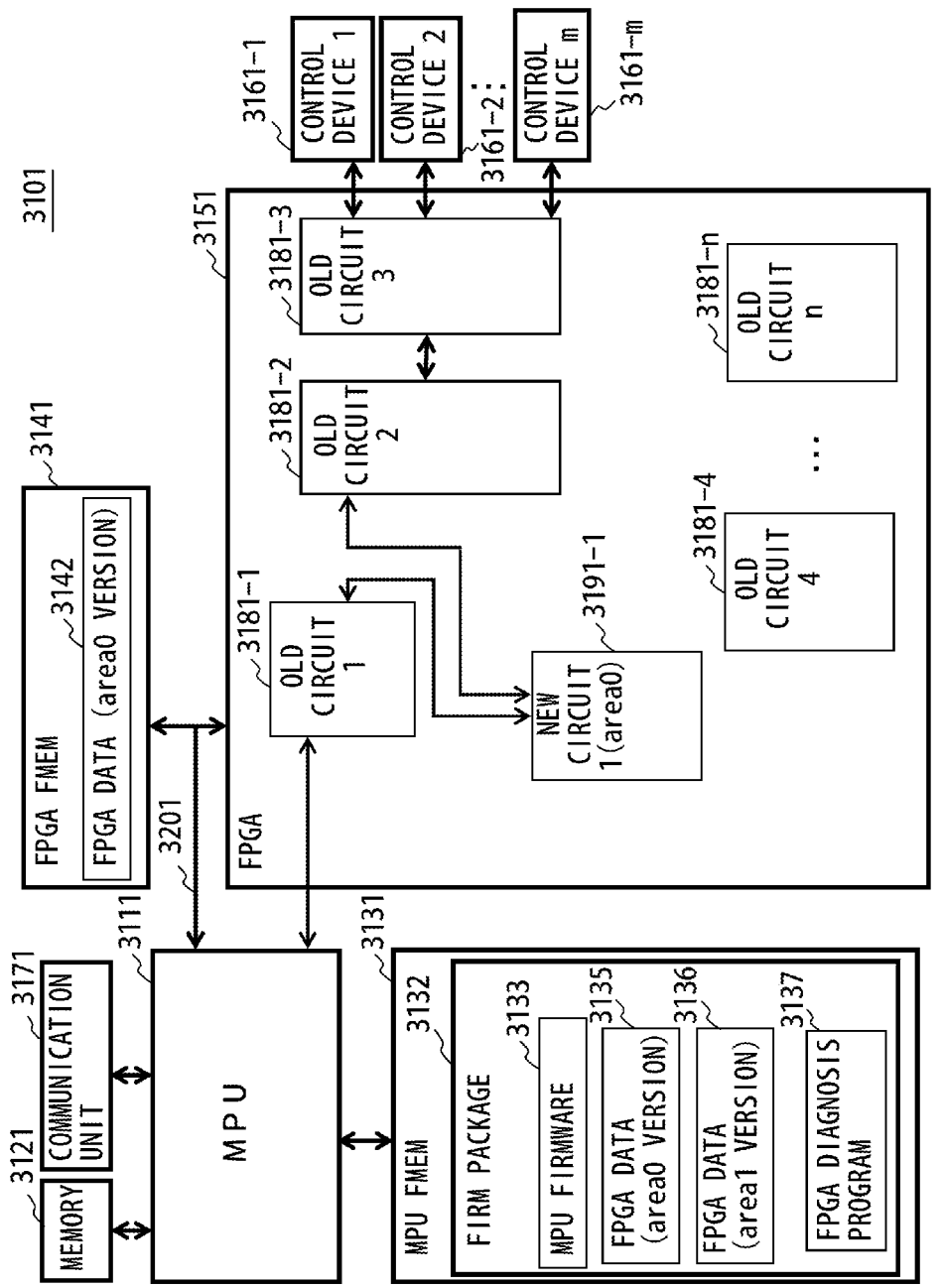
FIG. 13 is a configuration diagram at the time of the first diagnosis after an update of the system according to the third embodiment.

FIG. 13 is a configuration diagram at the time of the first diagnosis after an update of the system according to the third embodiment.

In the case where the FPGA 3151 is updated, the MPU 3111 receives the new firm package 3132 via the communication unit 3171 and stores it in the MPU FMEM 3131 and thus updates the firm package 3132. Then, the MPU 3111 reads FPGA data (area0 version) 3135, stores FPGA data (area0 version) 3142 in the FPGA FMEM 3141, and reconfigures the FPGA 3151.

The firm package 3132 after an update includes the MPU firmware 3133, the FPGA data (area0 version) 3135, FPGA data (area1 version) 3136, and an FPGA diagnosis program 3137.

The MPU firmware 3133 is a program that gives instructions to perform an updating of the firm package 3132, reconfiguration of the FPGA 3151, etc.

The FPGA data (area0 version) 3135 is information on circuits to be configured within the FPGA 3151. The FPGA data (area0 version) 3135 includes information on the structures of the circuits to be configured within the FPGA 3151, the positions of the circuits, the relationship between the circuits, etc.

The FPGA data (area1 version) 3136 is information on circuits to be configured within the FPGA 3151. The FPGA data (area1 version) 3136 includes information on the structures of the circuits to be configured within the FPGA 3151, the positions of the circuits, the relationship between the circuits, etc.

The FPGA diagnosis program 3137 is a program that performs diagnosis of the FPGA 3151.

The FPGA diagnosis program 3137 only performs diagnosis of all the circuits (new circuits) added by an update and the circuits needed for the operation of the new circuits.

In the FPGA diagnosis program 3137, circuits to be diagnosed, diagnosis processing, etc., are set in advance.

The FPGA FMEM 3141 stores the FPGA data (area0 version) 3142.

FPGA data (area0 version) 3142 is information on circuits to be configured within the FPGA 3151. The FPGA data (area0 version) 3142 is generated by the MPU 3111 copying the FPGA data (area0 version) 3135. Consequently, the contents of the FPGA data (area0 version) 3142 and those of the FPGA data (area0 version) 3135 are the same.

In the FPGA 3151, based on the FPGA data (area0 version) 3142, the old circuits 3181-1 to 3181-*n* and a new circuit (area0 version) 3191-1 are configured. Hereinafter, the old circuits 3181-1 to 3181-*n* are represented as the old circuits 1 to n, respectively, and the new circuit 3191-1 as the new circuit 1 (area0 version).

The old circuits 1 to n are the circuits already configured within the FPGA 3151 also in the FPGA 3151 before an update.

The new circuit 1 (area0 version) is a circuit newly added in the FPGA 3151 after an update, in contrast to the FPGA 3151 before an update.

The old circuit 1 connects with the new circuit 1 (area0 version) and the MPU 3111.

The old circuit 2 connects with the new circuit 1 (area0 version) and the old circuit 3.

The old circuit 3 connects with the old circuit 2 and the control devices 3161-1 to 3161-*m*.

The new circuit 1 (area0 version) connects with the old circuits 1 and 2. The new circuit 1 is a circuit that operates at the time of normal operation of the system 3101.

The new circuit 1 (area0 version) is configured in an area area0 within the FPGA 3151.

The old circuits 1 to 3 are the circuits needed for the operation of the new circuit 1 (area0 version). The circuit needed for the operation of the new circuit is a circuit that operates (is used) at the time of the operation of the new circuit. The circuit needed for the operation of the new circuit is, for example, a circuit that generates data used by the new circuit at the time of the operation and outputs the data to the new circuit, relays data input from another circuit to the new circuit, etc.

The old circuits 4 to n are the circuits not needed for the operation of the new circuit 1 (area0 version). In other words, it is possible for the new circuit 1 (area0 version) to operate normally even if the circuits 4 to n are not in operation.

In the case where the FPGA diagnosis program 3137 detects an error in the new circuit 1 (area0 version) configured in the area0 within the FPGA 3151, the MPU 3111 reads the FPGA data (area1 version) 3136, stores the FPGA data (area1 version) 3143 in the FPGA FMEM 3141, and reconfigures the FPGA 3151. Then, the FPGA diagnosis program 3137 diagnoses the FPGA 3151 again.

Figure 14:
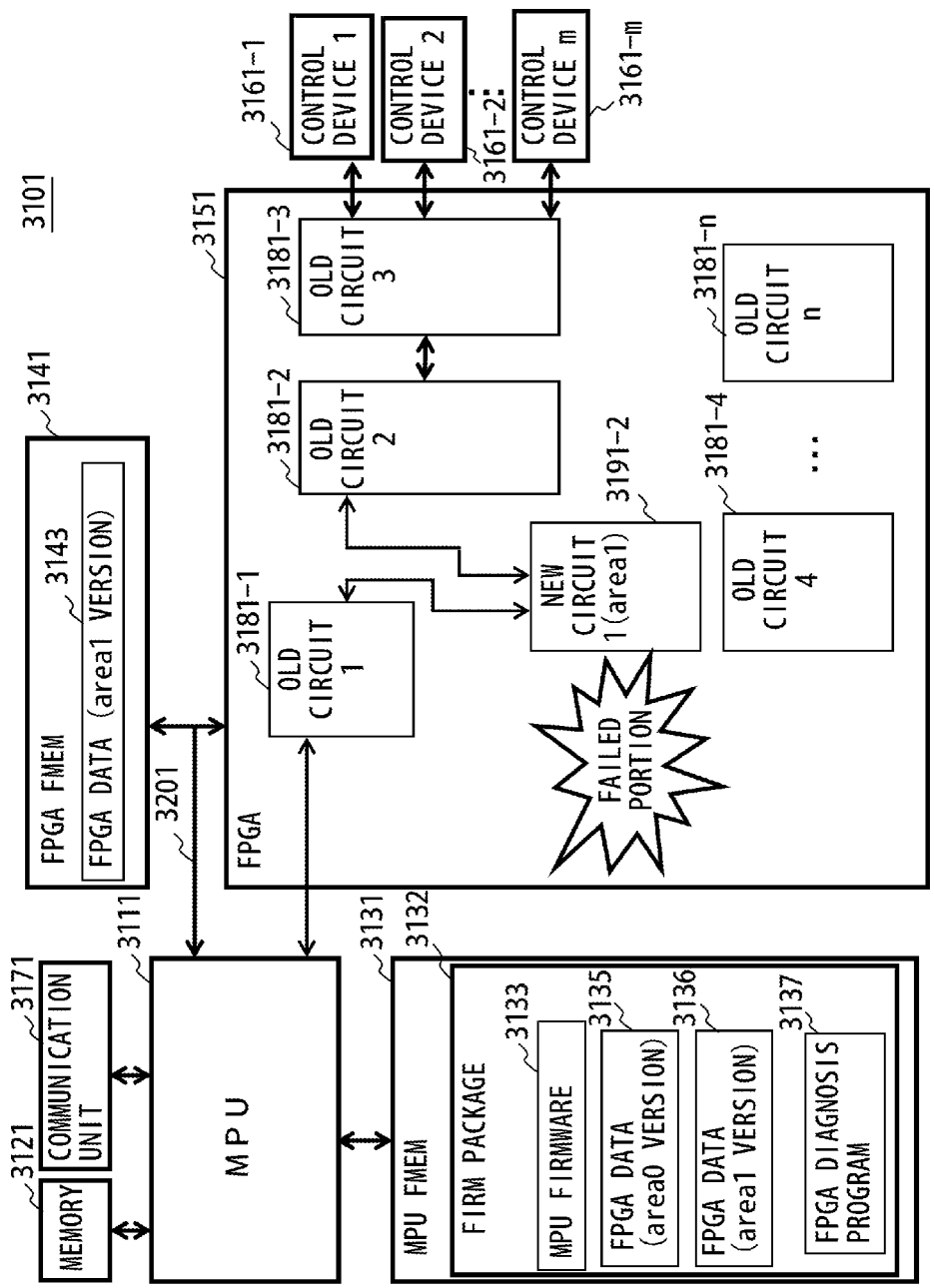
FIG. 14 is a configuration diagram at the time of the second diagnosis after an update of the system according to the third embodiment.

FIG. 14 is a configuration diagram at the time of the second diagnosis after an update of the system according to the third embodiment.

The FPGA FMEM 3141 stores the FPGA data (area1 version) 3143.

The FPGA data (area1 version) 3143 is information on circuits to be configured within the FPGA 3151. The FPGA data (area1 version) 3143 is generated by the MPU 3111 copying the FPGA data (area1 version) 3136. Consequently, the contents of the FPGA data (area1 version) 3143 and those of the FPGA data (area1 version) 3136 are the same.

The FPGA data (area1 version) 3136 includes information on configuring a new circuit (area1 version) 3192-1 having the same function as that of the new circuit (area0 version) 3191-1 in an area different from the area in which the new circuit (area0 version) 3191-1 is configured.

In the FPGA 3151, based on the FPGA data (area1 version) 3143, the old circuits 3181-1 to 3181-*n* and the new circuit (area1 version) 3192-1 are configured. Hereinafter, the old circuits 3181-1 to 3181-*n* are represented as the old circuits 1 to n, respectively, and the new circuit 3192-1 as the new circuit 1 (area1 version).

The old circuits 1 to n are the circuits already configured within the FPGA 3151, also in the FPGA 3151 at the time of the first diagnosis in FIG. 13.

The new circuit 1 (area1 version) is a circuit newly added in the FPGA 3151 after an update, in contrast to the FPGA 3151 before an update in FIG. 12.

The old circuit 1 connects with the new circuit 1 (area1 version) and the MPU 3111.

The old circuit 2 connects with the new circuit 1 (area1 version) and the old circuit 3.

The old circuit 3 connects with the old circuit 2 and the control devices 3161-1 to 3161-*m*.

The new circuit 1 (area1 version) connects with the old circuits 1 and 2. The new circuit 1 is a circuit that operates at the time of normal operation of the system 3101.

The new circuit 1 (area1 version) is configured in an area area1 within the FPGA 3151. The area area1 is an area different from the area area0.

The function of the new circuit 1 (area1 version) is the same as that of the new circuit 1 (area0 version).

The old circuits 1 to 3 are the circuits needed for the operation of the new circuit 1 (area1 version). The circuit needed for the operation of the new circuit is a circuit that operates (is used) at the time of the operation of the new circuit. The circuit needed for the operation of the new circuit is, for example, a circuit that generates data used by the new circuit at the time of the operation and outputs the data to the new circuit, relays data input from another circuit to the new circuit, etc.

The old circuits 4 to n are the circuits not needed for the operation of the new circuit 1 (area1 version). In other words, it is possible for the new circuit 1 (area1 version) to operate normally even if the circuits 4 to n are not in operation.

FIG. 15 is a flowchart of a diagnosis method according to the third embodiment.

The FPGA 3151 has already been reconfigured based on the FPGA data 3142 and the configuration is that before an update illustrated in FIG. 12.

It is assumed that the MPU 3111 has executed the MPU firmware 3133.

At step S3501, the MPU 3111 receives the firm package 3132 via the communication unit 3171 from an external device connected with the system 3101 via the network and writes the firm package 3132 to the MPU FMEM 3131.

At step S3502, the MPU 3111 reads the FPGA data (area0 version) 3135, serves as a bus master via a serial bus 3201, and writes it to the FPGA FMEM 3141. The FPGA data (area0 version) written to the FPGA FMEM 3141 as described above is represented as the FPGA data 3142.

At step S3503, the MPU 3111 gives instructions to perform reconfiguration to the FPGA 3151. Upon receipt of the instructions, the FPGA 3151 performs reconfiguration. In detail, the FPGA 3151 reads the FPGA data (area0 version) 3142 and configures the old circuits 1 to n and the new circuit 1 (area0 version) based on the FPGA data (area0 version) 3142. As described above, the new circuit 1 (area0 version) is configured in the area area0 within the FPGA 3151. It may also be possible for the FPGA 3151 to receive the FPGA data (area0 version) 3135 from the MPU FMEM 3131 via the MPU 3111 and to configure the old circuits 1 to n and the new circuit 1 (area0 version) based on the FPGA data (area0 version) 3135. In such a case, the processing to write the FPGA data (area0 version) 3135 to the FPGA FMEM 3141 at step S3502 may be omitted.

At step S3504, the MPU 3111 executes the FPGA diagnosis program 3137. By means of the FPGA diagnosis program 3137, the MPU 3111 diagnoses the new circuit 1 (area0 version) and the old circuits 1 to 3. In the diagnosis processing, for example, predetermined commands and data are input to a circuit to be diagnosed and whether or not the circuit operates normally is checked.

At step S3505, in the case where the diagnosis is completed normally, the processing is exited and in the case where the diagnosis is not completed normally (i.e., in the case where an error is detected in any of the new circuit 1 (area0 version) and the old circuits 1 to 3), the control proceeds to step S3506.

At step S3506, the MPU 3111 reads the FPGA data (area1 version) 3136, serves as a bus master via the serial bus 3201, and writes it to the FPGA FMEM 3141. The FPGA data (area1 version) written to the FPGA FMEM 3141 as described above is represented as the FPGA data 3143.

At step S3507, the MPU 3111 gives instructions to perform reconfiguration to the FPGA 3151. Upon receipt of the instructions, the FPGA 3151 performs reconfiguration. In detail, the FPGA 3151 reads the FPGA data (area1 version) 3143 and configures the old circuits 1 to n and the new circuit 1 (area1 version) based on the FPGA data (area1 version) 3143. As described above, the new circuit 1 (area1 version) is configured in the area area1 of the FPGA 3151. It may also be possible for the FPGA 3151 to receive the FPGA data (area1 version) 3136 from the MPU FMEM 3131 and to configure the old circuits 1 to n and the new circuit 1 (area1 version) based on the FPGA data (area0 version) 3136. In such a case, the processing to write the FPGA data (area1 version) 3136 to the FPGA FMEM 3141 at step S3506 may be omitted.

At step S3508, the MPU 3111 executes the FPGA diagnosis program 3137 again. By means of the FPGA diagnosis program 3137, the MPU 3111 diagnoses the new circuit 1 (area1 version) and the old circuits 1 to 3.

At step S3509, in the case where the diagnosis is completed normally, the processing is exited and in the case where the diagnosis is not completed normally (i.e., in the case where an error is detected in any of the new circuit 1 (area1 version) and the old circuits 1 to 3), the control proceeds to step S3510.

At step S3510, the MPU 3111 makes a notification of a failure. For example, the MPU 3111 produces a display to the effect that an error is detected on the display unit (not illustrated) of the system 3101 or notifies an external device connected with the system 3101 via the network of the error.

According to the system of the third embodiment, by diagnosing all the circuits newly added by an update, an error due to the potential failure is no longer detected while the system is in operation, and therefore, reliability of the system is improved.

In the case where the potential failures occur concentratedly in a certain portion in the manufacturing process of the FPGA, if an updating is performed in a number of systems, the failure of the FPGA is detected in the number of systems and there is a possibility that the parts for maintenance will run short.

According to the system of the third embodiment, in the case where a failure is detected by diagnosis, it is possible to do without replacement of the FPGAs by configuring a new circuit again in another area to avoid the failure.

According to the system of the third embodiment, it is possible to avoid the risk that parts for maintenance will run short and to reduce the amount of maintenance work by avoiding potential failures without increasing the circuit use rate of the FPGA.

FIG. 16 is a configuration diagram of an information processing apparatus (computer).

The systems 1101, 2101, and 3101 of the embodiments are implemented by, for example, an information processing apparatus 1 as illustrated in FIG. 16.

The information processing apparatus 1 includes a central processing unit (CPU) 2, a memory 3, an input unit 4, an output unit 5, a storage unit 6, a recording medium drive unit 7, and a network connection unit 8, and these units are connected to one another by a bus 9.

The CPU 2 is a central processing unit that controls the whole of the information processing apparatus 1. The CPU 2 corresponds to the MPUs 1111, 2111, and 3111.

The memory 3 is a memory, such as a read only memory (ROM) or a random access memory (RAM), which temporarily stores a program or data stored in the storage unit 6 (or a portable recording medium 10) when the program is executed. The CPU 2 performs the above-described various kinds of processing by executing programs by using the memory 3.

In this case, the program code itself read from the portable recording medium 10 etc. implements the function of the embodiments.

The input unit 4 is, for example, a keyboard, a mouse, a touch panel, etc.

The output unit 5 is, for example, a display, a printer, etc.

The storage unit 6 is, for example, a magnetic disk device, an optical disk device, a tape device, a nonvolatile memory, etc. The information processing apparatus 1 saves the above-described programs and data in the storage unit 6 and reads them onto the memory 3 for use in accordance with necessity.

The storage unit 6 corresponds to the MPU FMEMs 1131, 2131, and 3131 and the FPGA FMEMs 1141, 2141, and 3141.

The recording medium drive unit 7 drives the portable recording medium 10 and accesses the contents recorded therein. As the portable recording medium, any computer-readable recording medium, such as a memory card, a flexible disk, a compact disk read only memory (CD-ROM), an optical disk, and a magneto-optical disk, can be used. A user stores the above-described programs and data in the portable recording medium 10 and reads them onto the memory 3 for use in accordance with necessity.

The network connection unit 8 is connected to a communication network, such as a LAN and a WAN, and carries out data conversion accompanying communication. The network connection unit 8 corresponds to the communication units 1171, 2172, and 3171.

An FPGA 11 configures circuits inside thereof based on the FPGA data. The FPGA 11 corresponds to the FPGAs 1151, 2151, and 3151.

All examples and conditional language provided herein are intended for pedagogical purposes to aiding the reader in understanding the invention and the concepts contributed by the inventor to further the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A diagnosis device comprising:
a storage unit configured to store first circuit configuration information;
a circuit unit configured to configure a first plurality of circuits based on the first circuit configuration information and a second plurality of circuits based on second circuit configuration information; and
a processor configured to update the first circuit configuration information to the second circuit configuration information and configured to diagnose all circuits newly added by the second circuit configuration information of the second plurality of circuits, wherein
the processor, when an error is detected in diagnosis processing, updates the second circuit configuration information to third circuit configuration information about configuring a second circuit having the same function as that of a first circuit newly added by the second circuit configuration information in a position different from that of the first circuit,
the circuit unit configures a third plurality of circuits based on the third circuit configuration information,
the processor diagnoses all circuits newly added by the third circuit configuration information of the third plurality of circuits,
the third plurality of circuits include the second circuit, and
the second circuit is configured at the position different from that of the first circuit in the circuit unit.

2. The diagnosis device according to claim 1, wherein
the processor diagnoses only all the circuits newly added and circuits needed for the operation of the circuits newly added.

3. The diagnosis device according to claim 1, wherein
the second circuit configuration information includes information on configuring a diagnosis circuit configured to diagnose all the circuits newly added by the second circuit configuration information,
the processor gives instructions to start diagnosis to the diagnosis circuit, and
upon receipt of the instructions, the diagnosis circuit diagnoses all the circuits newly added by the second circuit configuration information.

4. The diagnosis device according to claim 3, wherein
the processor, when a notification that the diagnosis is completed is received from the diagnosis circuit, updates the second circuit configuration information to the third circuit configuration information, and
the circuit unit configures the third plurality of circuits based on the third circuit configuration information.

5. A control method of a diagnosis device having a storage unit configured to store first circuit configuration information, the control method comprising:
configuring, by a circuit unit possessed by the diagnosis device, a first plurality of circuits based on the first circuit configuration information;
updating, by a processor possessed by the diagnosis device, the first circuit configuration information to second circuit configuration information;
configuring, by the circuit unit, a second plurality of circuits based on the second circuit configuration information; and
diagnosing, by the processor, all circuits newly added by the second circuit configuration information of the second plurality of circuits, wherein
in the diagnosing process, when an error is detected:
the second circuit configuration information is updated to a third circuit configuration information about configuring a second circuit having the same function as that of a first circuit newly added by the second circuit configuration information in a position different from that of the first circuit,
a third plurality of circuits is configured in the circuit unit based on the third circuit configuration information,
all circuits newly added by the third circuit configuration information of the third plurality of circuits are diagnosed,
the third plurality of circuits include the second circuit, and
the second circuit is configured unit at the position different from that of the first circuit in the circuit.

6. The diagnosis method according to claim 5, wherein
in the diagnosing process, only all the circuits newly added and circuits needed for the operation of the circuits newly added are diagnosed.

7. The diagnosis method according to claim 5, wherein
the second circuit configuration information includes information on configuring a diagnosis circuit configured to diagnose all the circuits newly added by the second circuit configuration information, and
in the diagnosing process, instructions to start diagnosis are given to the diagnosis circuit, and all the circuits newly added by the second circuit configuration information are diagnosed by the diagnosis circuit.

8. The diagnosis method according to claim 7, wherein
in the diagnosing process, when a notification that the diagnosis has been completed is received from the diagnosis circuit, the second circuit configuration information is updated to the third circuit configuration information, and
the third plurality of circuits is configured in the circuit unit based on the third circuit configuration information.

9. A non-transitory computer-readable recording medium storing control programs that cause a diagnosis device having a storage unit configured to store first circuit configuration information to perform a diagnosis process, the process comprising:
configuring a first plurality of circuits based on the first circuit configuration information in a circuit unit possessed by the diagnosis device;
updating the first circuit configuration information to second circuit configuration information;
configuring a second plurality of circuits based on the second circuit configuration information in the circuit unit; and
diagnosing all circuits newly added by the second circuit configuration information of the second plurality of circuits, wherein
in the diagnosing process, when an error is detected:
the second circuit configuration information is updated to third circuit configuration information about configuring a second circuit having the same function as that of a first circuit newly added by the second circuit configuration information in a position different from that of the first circuit;
a third plurality of circuits is configured in the circuit unit based on the third circuit configuration information;
all circuits newly added by the third circuit configuration information of the third plurality of circuits are diagnosed;
the third plurality of circuits include the second circuit; and the second circuit is configured at the position different from that of the first circuit in the circuit unit.

10. The non-transitory computer-readable recording medium according to claim 9, wherein
in the diagnosing process, only all the circuits newly added and circuits needed for the operation of the circuits newly added are diagnosed.

11. The non-transitory computer-readable recording medium according to claim 9, wherein
the second circuit configuration information includes information on configuring a diagnosis circuit configured to diagnose all the circuits newly added by the second circuit configuration information, and
in the diagnosing process, instructions to start diagnosis are given to the diagnosis circuit.

12. The non-transitory computer-readable recording medium according to claim 11, wherein
in the diagnosing process, when a notification that the diagnosis has been completed is received from the diagnosis circuit, the second circuit configuration information is updated to the third circuit configuration information; and
the third plurality of circuits is configured in the circuit unit based on the third circuit configuration information.

\* \* \* \* \*